United States Patent [19]

Keeler et al.

[11] Patent Number: 5,825,646
[45] Date of Patent: Oct. 20, 1998

[54] METHOD AND APPARATUS FOR DETERMINING THE SENSITIVITY OF INPUTS TO A NEURAL NETWORK ON OUTPUT PARAMETERS

[75] Inventors: James David Keeler; Eric J. Hartman; Kadir Liano, all of Austin, Tex.

[73] Assignee: Pavilion Technologies, Inc., Austin, Tex.

[21] Appl. No.: 656,702

[22] Filed: Jun. 3, 1996

Related U.S. Application Data

[63] Continuation of Ser. No. 56,197, Apr. 30, 1993, abandoned, which is a continuation-in-part of Ser. No. 25,184, Mar. 2, 1993, abandoned.

[51] Int. Cl.$^6$ .................................................. G05B 13/02
[52] U.S. Cl. ................ 364/164; 364/148.03; 364/148.05
[58] Field of Search .................... 364/148–153, 364/164, 165; 395/22, 23, 75

[56] References Cited

U.S. PATENT DOCUMENTS

| | | | |
|---|---|---|---|
| 4,893,255 | 1/1990 | Tomlinson, Jr. ......................... | 364/513 |
| 4,912,753 | 3/1990 | Evans, Jr. ................................. | 364/513 |
| 4,928,484 | 5/1990 | Peczkowski .............................. | 60/240 |
| 4,979,126 | 12/1990 | Pao et al. ................................. | 364/513 |
| 5,052,043 | 9/1991 | Gaborski ................................. | 395/22 X |
| 5,111,531 | 5/1992 | Grayson ................................. | 395/22 X |
| 5,113,483 | 5/1992 | Keeler et al. .............................. | 395/23 |
| 5,119,468 | 6/1992 | Owens ..................................... | 395/22 |
| 5,142,612 | 8/1992 | Skeirik ................................... | 395/22 X |
| 5,175,678 | 12/1992 | Frerichs et al. .......................... | 364/148 |

FOREIGN PATENT DOCUMENTS 0 463 934 A1   2/1992   European Pat. Off. .

OTHER PUBLICATIONS

Caudill, M.; Using Neural Nets: Diagnostic Expert Nets Part 5; AI Expert; Sep. 1990.

Hergert, F. et al.; A Comparison of Weight Elimination Methods For Reducing Complexity in Neural Networks; IEEE 1992.

(List continued on next page.)

*Primary Examiner*—Thomas C. Lee
*Assistant Examiner*—Steven R. Garland
*Attorney, Agent, or Firm*—Gregory M. Howison

[57] ABSTRACT

A distributed control system (14) receives on the input thereof the control inputs and then outputs control signals to a plant (10) for the operation thereof. The measured variables of the plant and the control inputs are input to a predictive model (34) that operates in conjunction with an inverse model (36) to generate predicted control inputs. The predicted control inputs are processed through a filter (46) to apply hard constraints and sensitivity modifiers, the values of which are received from a control parameter block (22). During operation, the sensitivity of output variables on various input variables is determined. This information can be displayed and then the user allowed to select which of the input variables constitute the most sensitive input variables. These can then be utilized with a control network (470) to modify the predicted values of the input variables. Additionally, a neural network (406) can be trained on only the selected input variables that are determined to be the most sensitive. In this operation, the network is first configured and trained with all input nodes and with all training data. This provides a learned representation of the output wherein the combined effects of all other input variables are taken into account in the determination of the effect of each of the input variables thereon. The network (406) is then reconfigured with only the selected inputs and then the network (406) again trained on only the input/output pairs associated with the select input variables.

20 Claims, 16 Drawing Sheets

OTHER PUBLICATIONS

Zhichao Guo and Robert E. Uhrig, "Sensitivity Analysis and Applications to Nuclear Power Plant," *International Joint Conference on Neural Networks*, vol. 2, Jun. 7, 1992, pp. 453–458.

L. H. Ungar, B. A. Powell and S. N. Kamens, "Adaptive Networks for Fault Diagnosis and Process Control," *Computers and Chemical Engineering*, vol, 14, No. 4/5, 1990, pp. 561–572.

S. J. Qin and T. J. McAvoy, "A Data–Based Process Modeling Approach and its Applications," *Dynamics and Control of Chemical Reactors, Distillation Columns and Batch Processes*, Apr. 26, 1992, pp. 93–98.

Chao–Chee Ku and Kwang Y. Lee, "Diagonal Recurrent Neural Network for Controller Designs," *Proceedings of the Second International Forum on Applications of Neural Networks to Power Systems*, Apr. 19, 1993, pp. 87–92.

Yan Le Cun, John S. Denker and Sara A. Solla, "Optimal Brain Damage" in *Advances in Neural Information Processing Systems 2*, edited by David S. Touretzky, 1990, pp. 598–605.

Andreas S. Weigend, David E. Rumelhart and Barnardo A. Huberman, "Generalization by Weight–Elimination with Application to Forecasting" in *Advances in Neural Information Processing Systems 3*, edited by Richard P. Lippmann, John E. Moody and David S. Touretzky, 1991, pp. 875–882.

Demetri Psaltis, Athanasios Sideris and Alan Yamamura, "Neural Controllers", IEEE First International Conference on Neural Networks, Jun. 21–24, 1987, IV–551–558.

Julio Tanomaur and Cigar Aimed, "Towards Effective Neuomorphic Controllers", Icon '91, pp. 1395–1400.

K.J. Hunt and D. Sbarbaro, "Neural networks for nonlinear internal model control", *IEEE Proceedings–D*, vol. 138, No. 5, Sep. 1991, pp. 431–438.

D. Sbarbaro and K.J. Hunt, "A Nonlinear Receding Horizon Controller Based on Connectionist Models", *Proceedings of the 30th IEEE Conference on Decision and Control*, 1991, vol. 1, pp. 172–173.

K.J. Hunt and D. Sbarbaro, "Connectionist Approach to Non–linear Internal Model Control Using Gaussian Approximation", *Proceedings of the 1991 American Control Conference*, vol. 2, Jun. 27, 1991, pp. 1826–1827.

Andrew G. Barto, "Connectionist Learning for Control" in *Neural Networks for Control*, edited by W. Thomas Miller, III, Richard S. Sutton, and Paul J. Werbos, 1990, pp.5–58.

Kumpati S. Narendra, "Adaptive Control Using Neural Networks" in *Neural Networks for Control*, editeds by W. Thomas Miller, III, Richard S. Sutton, and Paul J. Werbos, 1990, pp. 115–142.

D.E. Rumelhart, G.E. Hinton and R.J. Williams, "Learning Internal Representations by Error Propagation" in *Parallel Distributed Processing* by D.E. Rumelhart and J.L. McClelland, vol. 1, 1986.

Avg. Absolute Sens.=
| Avg. Sens. | ≠ 0

Linear, Monotonic

Avg. Absolute Sens.=
| Avg. Sens.| ≠ 0

Nonlinear, Monotonic

Avg. Absolute Sens.
> | Avg. Sens.|

Avg. Absolute Sens.
= Avg. Sens.= 0

METHOD AND APPARATUS FOR DETERMINING THE SENSITIVITY OF INPUTS TO A NEURAL NETWORK ON OUTPUT PARAMETERS

This application is a continuation of U.S. patent application Ser. No. 08/056,197, filed Apr. 30, 1993 and entitled "METHOD AND APPARATUS FOR DETERMINING THE SENSITIVITY OF INPUTS TO A NEURAL NETWORK ON OUTPUT PARAMETERS", now abandoned, which is a continuation-in-part of U.S. patent application Ser. No. 08/025,184, filed Mar. 2, 1993 and entitled "METHOD AND APPARATUS FOR ANALYZING A NEURAL NETWORK WITHIN DESIRED OPERATING PARAMETER CONSTRAINTS", now abandoned, and is related to U.S. patent application Ser. No. 08/759,539, filed Dec. 4, 1996 and entitled "METHOD AND APPARATUS FOR ANALYZING A NEURAL NETWORK WITHIN DESIRED OPERATING PARAMETER CONSTRAINTS", which is a continuation of U.S. patent application Ser. No. 08/025,184, filed Mar. 2, 1993 and entitled "METHOD AND APPARATUS FOR ANALYZING A NEURAL NETWORK WITHIN DESIRED OPERATING PARAMETER CONSTRAINTS", now abandoned.

TECHNICAL FIELD OF THE INVENTION

The present invention pertains in general to neural networks, and more particularly, to analyzing the operation of a neural network as a function of the sensitivity of input parameters on the neural network.

BACKGROUND OF THE INVENTION

Neural networks have been utilized in an ever increasing manner to predict system operation in the future such that adjustments to the system can be anticipated and also to provide control inputs to a manufacturing control system. These networks provide a non-linear representation of a plant, which non-linear representation was learned through the use of historical training data. Once the system is running, it is often desirable to change any of the operating parameters of the system through the use of either the control operation of the neural network or to determine how changes in the inputs to the neural network will affect the predicted output. These changes are often constrained by physical limitations of the plant, or by user-defined constraints supplied to achieve desired behavior. The present invention provides a novel mechanism for achieving such desired behavior while simultaneously satisfying constraints.

When utilizing neural networks as predictive tools, a system designer may be locked into the overall operating system. For example, control networks typically receive a desired output and then generate control inputs to force the control inputs to a state that will yield the desired input by minimizing the error value between a predictive output and a desired output. These control networks provide as an output a control input to the system, which then responds accordingly. However, the way in which the input is applied is not controlled. For example, a user may change the desired output to increase impurity concentration for a given process. This could entail changing the flowrate of two valves, changing the heater control, etc. Unfortunately, the operation of the plant during this change to achieve the desired output is unknown, and it is not until the entire system has settled down and the desired output has been reached that the system is operated as desired.

In order to alter the inputs to a plant to achieve a desired effect in accordance with the suggested control input changes from a control system, it is necessary for the operator and/or the control system to determine how much each input value should change and also in what the sequence of change should be. One factor that complicates the control strategy that is implemented is the sensitivity of the output on each of the input values. For example, the outputs in some plants are very sensitive to certain input values and exhibit almost no change as a function of changes in other input values. However, this fact is not known until the predictive network that represents the plant is completely trained on all input values. Therefore, the network requires all input values in order to operate. Of course, the ones of the input values that cause no change in the output can be clamped to zero, if these input variables can be discriminated, and then the network run to define or to predict new and updated input values. Therefore, in order to eliminate the least sensitive input values, it is first necessary to determine which of these input values causes little or no change in the output and then eliminate these values from the input. One problem that exists in determining the sensitivity of the input variables on the network, and subsequently eliminating the input variables as inputs to the network, is whether the dependence of the outputs on the input variables is linear or non-linear. Further, it is necessary to determine whether the output is sensitive to a combination of input variables as opposed to being sensitive only to individual input variables. For example, a given input variable in isolation may cause no change in the output. However, this input variable in combination with a change in another input variable may cause a large change in the output variable. Therefore, non-linear relationships between the input variable and the output variable must be discerned in order to accurately determine the sensitivity of the output variables on input variables.

SUMMARY OF THE INVENTION

The present invention disclosed and claimed herein comprises a network training system for reducing the number of inputs in a non-linear predictive network having stored therein a representation of a plant. A dataset is provided consisting of training patterns representing the input variables and measured output variables associated with the network, with a given pattern having input values associated with the input variables and corresponding output values associated with the measured output variables. A sensitivity processor is operable to determine the sensitivities of each of the output variables as a function of each of the input variables. The sensitivity is the effect of each of the input variables on a learned representation of the output variables, which learned representation is learned over all of the input variables. This allows the combined effects of all other input variables to be taken into account. Once the sensitivity is determined, it is compared with predetermined criteria and select ones of the input variables chosen from the dataset. A network model is then trained only on the select input variables and the associated portion of the training patterns, with the model receiving only the selected input variables. The model then provides a predictive output for the received ones of the selected input variables. The network model is trained in accordance with a predetermined training algorithm.

In another embodiment of the present invention, a second network model is provided which is operable to receive as inputs all of the input variables and provide predictive outputs associated with each of the output variables in the dataset. The second network model is trained on all of the input variables and output variables in the dataset to provide the learned representation of the output variables. The effect of each of the input variables to the network can then be determined on the learned representation of the output variables, with the network allowing the combined effects of all other input variables to be taken into account for determining the effect of any of the input variables on any one of the predicted output variables.

In yet another aspect of the present invention, a single neural network is utilized that has an input layer having a defined number of inputs for receiving input variables, an output layer for outputting a predetermined number of outputs and a hidden layer for mapping the input layer to the output layer. The neural network is configurable such that, in one mode, it can receive on the input layer all of the input variables and be trained on the entire dataset. In a second mode it can be configured to receive only the select ones of the input variables on the input layer and be trained only on the select portion of the dataset associated with the select ones of the input variables.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
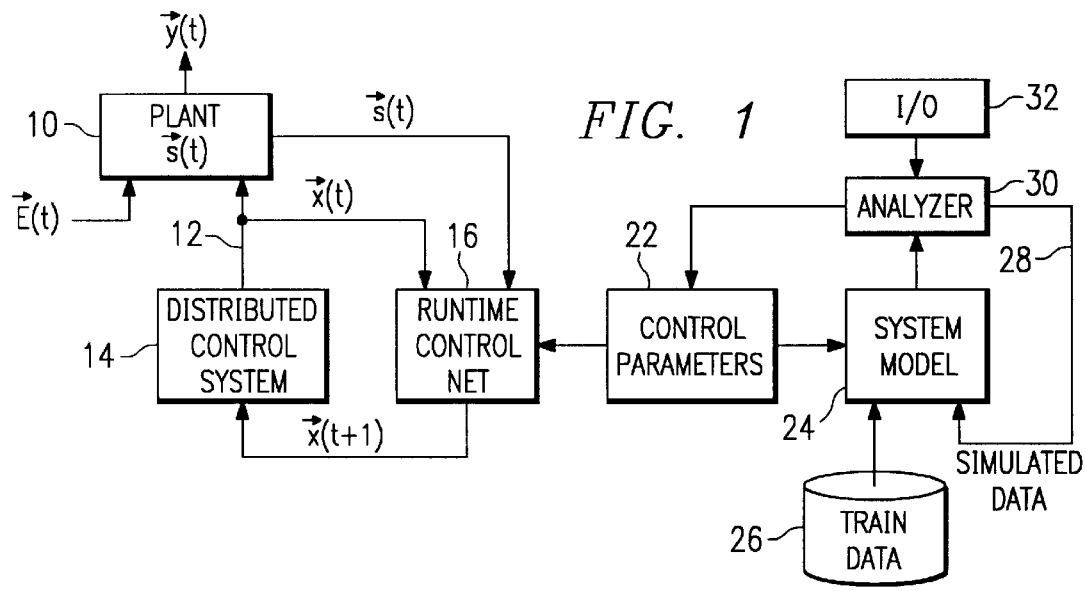
FIG. 1 illustrates a block diagram of the overall system to provide the analyzer function.

Referring now to FIG. 1, there is illustrated a block diagram of the overall system and analyzer. In general, a plant 10 is provided that can be any type of physical, chemical, biological, electronic or economic process with inputs and outputs. The plant has an output y(t) and control inputs x(t), the control inputs x(t) provided on an input 12. In addition, the plant 10 has external inputs E(t), which comprise such things as the ambient temperature, the humidity, etc. These are typically parameters that cannot be controlled. The plant also has associated therewith measured state variables s(t), such as flowrates, temperature measurements, etc. These are typically measured variables. It should be understood that the flowrate or the temperature may be directly associated with one of the control inputs x(t) such as, for example, flowrate. Typically, a valve constitutes a control input and the flowrate merely represents the setting on that valve. Therefore, a setting of the valve would constitute a flowrate. However, it is a measure of this flowrate that constitutes a measured state variables in s(t).

The control inputs x(t) are generated by a distributed control system 14. The output of the distributed control system, comprising the control inputs x(t), and the state variables s(t), are input to a runtime control network 16, which generates control inputs x(t+1) that are utilized to provide the settings for the distributed control system 14. The runtime control net 16, as will be described hereinbelow, incorporates a predictive model of the plant 10, in the form of a neural network or any other type of non-linear network. An inverse network is also provided for generating the predictive inputs to the distributed control system 14.

The runtime control network 16 operates in accordance with control parameters stored in a memory block 22. As will be described hereinbelow, the runtime control net will operate the distributed control system 14 in accordance with various criteria such as a desired target output and desired "cost factors" for the input parameters of the network and for the predictive output from the network, and also as to limitations that may be placed upon the control inputs, such as rate-of-change and maximum and minimum constraints on the range of the input values, or combinatorial constraints such as constraints on the ratio or sum of constituents of a mixture. Additionally, the sensitivity of the output on certain input variables can be compensated for in order to account for these sensitivities.

A parallel system is provided to the runtime control net 16, which utilizes a system model 24. The system model 24 is operable to receive on the input thereof either training data from a memory 26, or simulated data on a line 28. The output of the system model 24 is input to an analyzer 30 which is operable to analyze the overall operation of the network. With this configuration, the plant 10 can be modeled in a system model 24, which system model 24 also incorporates the features of the runtime control net 16, in order to analyze the operation of the plant as a function of constraints that may be placed on the input or on the control inputs to the plant 10, and also on the output of the plant, as indicated by the internal prediction of the output. By providing a parallel system, this operation can be accomplished completely independent of the runtime control net 16. However, once the analysis has been performed by the analyzer 30, new control parameters can be generated, and downloaded to the control parameter block 22 for use by the runtime control net 16 in real time. The analyzer is operated through use of an input/output device 32 such that an operator can input information to the analyzer 30 and this information can be displayed. The analyzer 30 is operable to generate the simulated data on the line 28.

Figure 1A:
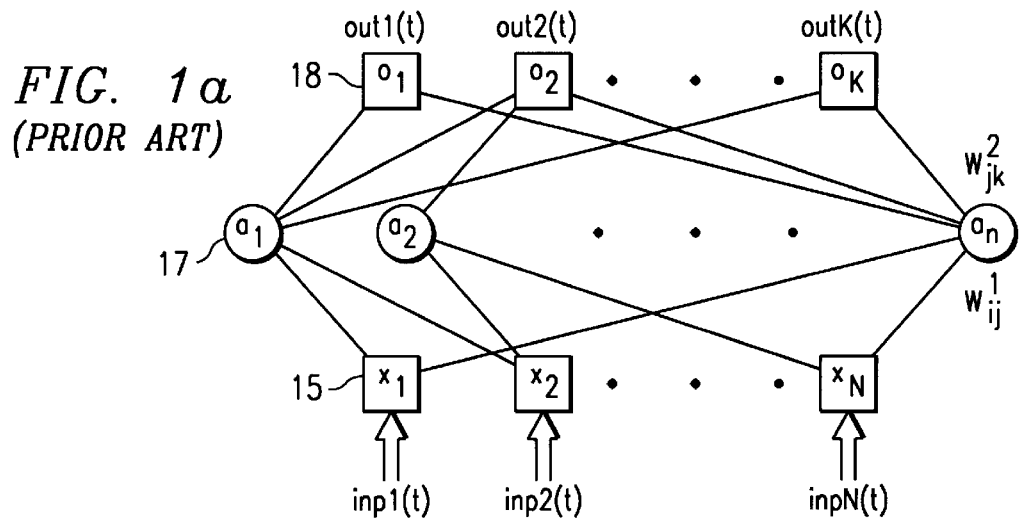
FIG. 1a illustrates a detailed diagram of a conventional neural network.

Referring now to FIG. 1a, there is illustrated a detailed diagram of a conventional neural network comprised of input nodes 15, hidden nodes 17 and output nodes 18. The input nodes 15 are comprised of N nodes labelled $x_1, x_2, \ldots X_N$, which are operable to receive an input vector $x(t)$ comprised of a plurality of inputs, INP1(t), INP2(t), . . . INPN(t). Similarly, the output nodes 18 are labelled $o_1, o_2, \ldots o_K$, which are operable to generate an output vector $o(t)$, which is comprised of the output OUT1(t), OUT2(t), . . . OUTK(t). The input nodes 14 are interconnected with the hidden nodes 17, hidden nodes 17 being labelled $a_1, a_2, \ldots a_n$, through an interconnection network where each input node 15 is interconnected with each of the hidden nodes 17. However, some interconnection schemes do not require full interconnect. Each of the interconnects has a weight $W_{ij}^1$. Each of the hidden nodes 17 has an output $o_i$ with a function g, the output of each of the hidden nodes defined as follows:

$$\vec{a}_j = g\left(\sum_{i=1}^{N} W_{ij}^1 x_i + b_j^1\right) \quad (1)$$

Similary, the output of each of the hidden nodes 17 is interconnected with substantially all of the output nodes 18 through an interconnect network, each of the interconnects having a weight $W_{jk}^2$ associated therewith. The output of each of the output nodes is defined as follows:

$$\vec{O}_k = g\left(\sum_{j=1}^{n} W_{jk}^2 a_j + b_k^2\right) \quad (2)$$

This neural network is then trained to learn the function f(x) that is embedded in the neural network from the input space to the output space as examples or input patterns are presented to it, and a Total-Sum-Square-Error function is minimized through use of a gradient descent on the parameters $W_{jk}^2, W_{ij}^1, b_j^1, b_k^2$.

The neural network described above is just one example. Other types of neural networks that may be utilized are those using multiple hidden layers, radial basis functions, gaussian bars (as described in U.S. Pat. No. 5,113,483, issued May 12, 1992, which is incorporated herein by reference), and any other type of general neural network. In the preferred embodiment, the neural network utilized is of the type referred to as a multi-layer perception network.

Figure 2:
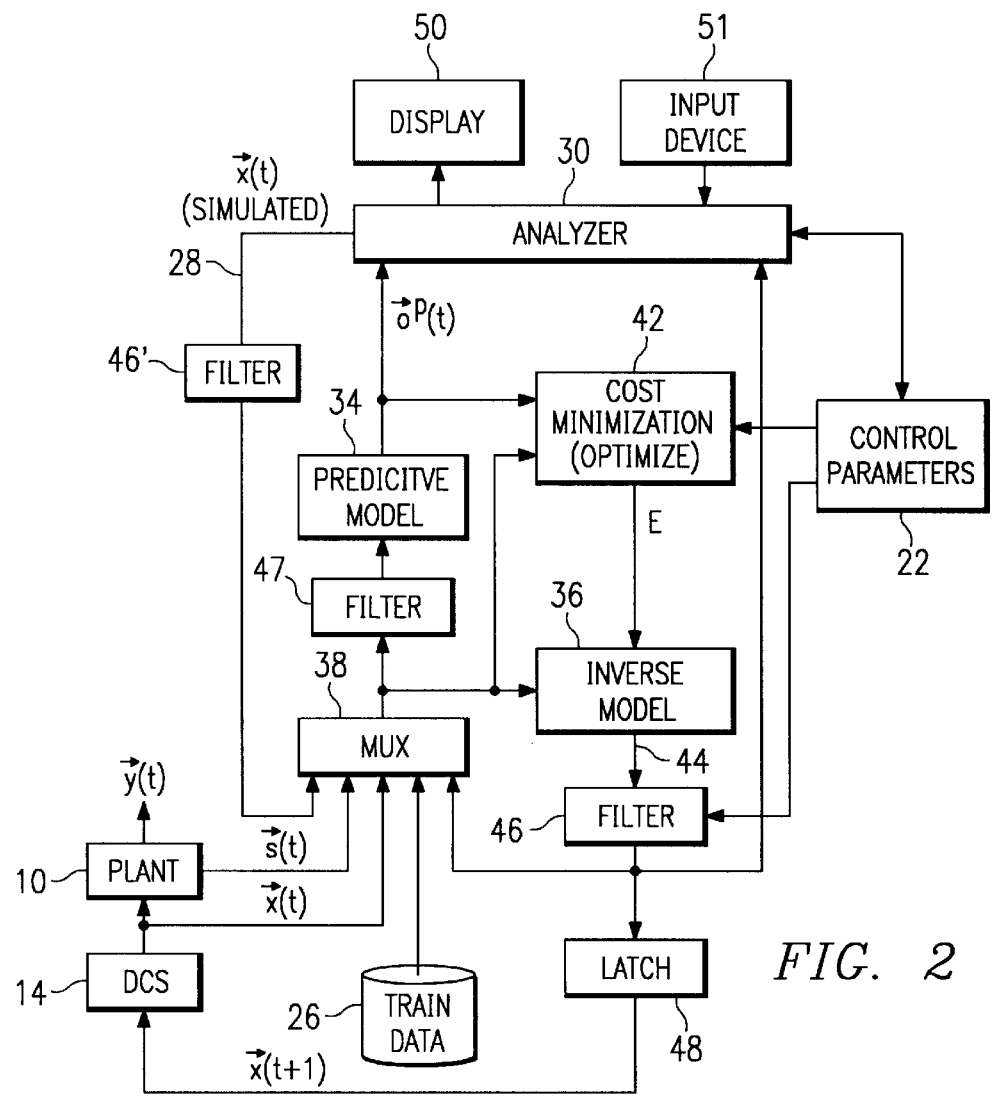
FIG. 2 illustrates a detail of the analyzer.

Referring now to FIG. 2, there is illustrated a more detailed diagram of the system of FIG. 1, wherein the overall system model 24 and runtime control net 16 are multiplexed in operation with the distributed control system 14. The runtime control net 16 and system model 24 are each comprised of a predictive model 34 and an inverse model 36.

The predictive model 34 is represented by the system of FIG. 1a, in that it is operable to receive the control input $x(t)$ and state variables $s(t)$ and output a predictive output $o^p(t)$, which represents the predictive output of the plant 10. The predictive model 34 has therein a stored representation of the plant 10, which stored representation is a learned representation which was learned on the training data stored in the memory 26. This is a separate training operation that will be described hereinbelow with respect to sensitivities. These are stored or fixed weights which determine how the predictive model 34 operates. To the extent that the predictive model 34 is an accurate model, the actual output of the plant 10 and the predicted output of the predictive model 34 will be essentially identical. However, whenever the actual output of the plant has to be varied, the plant control inputs must also be varied, this effected through the runtime control net 16 and the distributed control system 14. The predictive model 34 receives the input therefor from the multiplexer 38. The multiplexer 38 is operable to receive the simulated control inputs from the line 28, passing through a filter 46', the actual control inputs to the plant 10 as the variable $x(t)$ and the state variables $s(t)$ from the distributed control system 14, or the training data from the memory 26. With regards to the input, the predictive model 34 can generate a predicted output that is a non-linear function of the inputs provided thereto. This predictive output $o^p(t)$ is input to the analyzer 30.

In order to provide the control network function, an error is generated so as to minimize the cost in a cost minimization block 42, which is operable to receive the predictive output $o^p(t)$ of the predictive model 34 and the inputs to the predictive model 34. The cost minimization block 42 also receives control parameters from the control block 22, which are utilized to calculate an error E, which in the preferred embodiment is then processed by the inverse model 36 in accordance with the general operation of a control network to minimize the cost and generate on an output 44 new control inputs. These updated control inputs are input to a block 46 that is labelled "filter". This block 46 functions to satisfy any "hard" constraints that have been placed on the system before they are input to the plant 10, or the predictive model 34. These constraints are of the following three types: 1) range constraints; 2) rate-of-change constraints, or 3) combinatorial constraints. Range constraints are of the form:

$$x_i^{lower} \leq x \leq x_i^{upper} \quad (3)$$

where $x_i^{lower}$ is the lower hard-limit or hard-constraint, and $x_i^{upper}$ is the corresponding upper hard-constraint, meaning that a particular control cannot be varied outside of these limits. Rate-of-change constraints are of the form:

$$\Delta x_{lower_i} \leq \Delta x \leq \Delta x_{upper_i} \quad (4)$$

where: $\Delta x = x(t+1) - x(t)$ meaning, e.g., that a particular control cannot be changed faster than the prescribed rate.

Combinatorial constraints are used to satisfy limits on the combinations of variables. For example, it is quite common that the sum of all of the flows into a system must equal 100% of the flow out. This is known as a mass-balance constraint, and can be expressed as:

$$\sum_{i \in \text{flow}} x_i = \text{constant} \quad (5)$$

More generally, we can have any function of the inputs: F(x)=constant, such as the ratio of two ingredients that must be constant, i.e., $x_i/x_j = C_i$.

Additionally, the filter 46 is operable to contain sensitivity parameters. The sensitivity parameters, as will be described hereinbelow, are parameters that determine how the predicted input values are to be changed prior to inputting them to the DCS 14. As will be described hereinbelow, the sensitivity of the output of the plant 10 on the various input variables is first determined and then the way in which the inputs are applied by the DCS 14 is determined by the sensitivity parameters. For example, one input variable may be determined to cause the most change in the output and this input variable will be selected first for application to the input of a plant 10. Further, the predicted outputs out of model 36 can be altered as a function of the sensitivity of the predicted outputs on line 44. For example, the most sensitive input variables may have the predicted values from inverse model 36 passed directly through to the DCS 14 and the least sensitive input values may have the predicted values attenuated. This will be described in more detail hereinbelow.

The contents of filter 46 are controlled by information received from the control parameter block 22. As will be described hereinbelow, the filter 46 is operable to place hard constraints on the inputs and/or other constraints such as rate of change, sensitivity considerations, etc., that may be required when applying new inputs to the plant 10. As will be appreciated, the predicted inputs generated by the inverse model 36 are generated as a function of the manner in which the overall control net minimizes the error function output by the minimization block 42. This will be described in more detail hereinbelow.

The output of the filter 46 is input to a latch 48, the output of which is input as the control inputs x(t+1) to the DCS 14. The latch 48 is operable to only pass through new control inputs during the runtime mode. During the analysis mode, the latch 48 prevents new data from being updated to the DCS 14. The output of filter 46 is also input back to the analyzer. The analyzer 30 is operable to control the overall operation of the system through either placing it in a runtime mode or placing it in an analysis mode. In the analysis mode, information is displayed on a display 50 with inputs received from an input device 51. Further, a filter 46' is incorporated on the line 28 to apply the hard constraints to the simulated inputs. Another filter, filter 47, is incorporated on the input to the predictive model 34 to allow constraints to be applied directly to the inputs to the model. Both filter 46' and filter 47 are controlled by block 22.

Figure 3A:
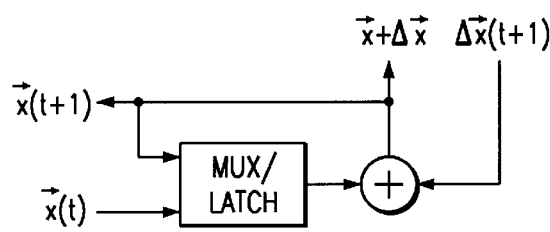
FIG. 3a illustrates a block diagram of the iterate block in FIG. 3.
Figure 3:
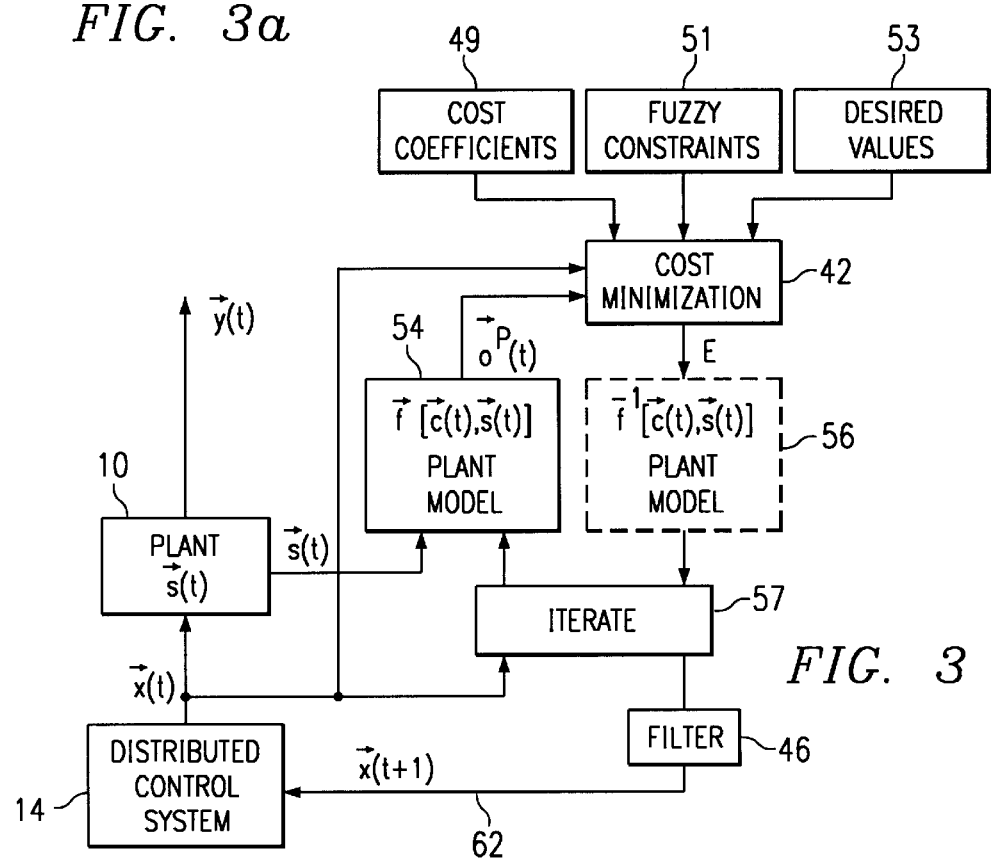
FIG. 3 illustrates a detailed block diagram of the control network.

Referring now to FIG. 3, there is illustrated a block diagram of a control system for optimization/control of a plant's operation in accordance with predetermined weights. A plant is generally shown as a block 10 having an input for receiving the control inputs x(t) and an output for providing the actual output y(t). A plant predictive model 54 is developed with a neural network to accurately model the plant 10 to provide an output $o^p(t)$, which represents the predicted output of plant predictive model 54. The inputs to the plant model 54 are the control inputs x(t) and the state variables s(t). For purposes of optimization/control, the plant model 54 is deemed to be a relatively accurate model of the operation of the plant 10. In an optimization/control procedure, various generated parameters stored in parameter blocks 49, 51 and 53 are input to the cost minimizer 42. The parameters are cost coefficients stored in the parameter block 49, fuzzy constraints stored in the parameter block 51 and desired values stored in the block 53. The operation of each of these will be described hereinbelow. These parameters from the parameter blocks 49, 51 and 53 are utilized by the cost minimization block 42, which also receives the output of the plant model $o^p(t)$ cost and a mechanism for generating new control inputs that satisfy the constraints in filter block 46 so as to minimize the cost. In the preferred embodiment, these new inputs are found through a plant-inverse model where the cost is translated into an error so that the error is input to the plant inverse model to generate new control inputs minimizing cost and satisfying constraints. The error E is input to an inverse plant model 56 which is identical to the neural network representing the plant predictive model 54, with the exception that it is operated by back propagating the error through the original plant model with the weights of the predictive model frozen. This back propagation of the error through the network is similar to an inversion of the network with the output of the inverse plant model 56 representing a Δx(t+1) utilized in a gradient descent operation illustrated by an iterate block 57. In operation, as illustrated in detail in FIG. 3a, the value Δx(t+1) is added initially to the input value x(t) and this sum then processed through the filter 46 and the plant predictive model 54 to provide a new predictive output $o^p(t)$ and a new error. This iteration continues until the error is reduced below a predetermined value. The final value is then output as the new predictive control variables x(t+1).

These new x(t+1) values comprise the control inputs that are required to achieve the desired operation of the plant 10. These are input to the plant control system 14, wherein a new value is presented to the system for input as the control variables x(t). The control system 14 is operable to receive a generalized control input which can be varied by the distributed control system 14. The general terminology for the back propagation of error for control purposes is "Back Propagation-to-Activation" (BPA).

In the preferred embodiment, the method utilized to back propagate the error through the inverse plant model 56 is to utilize a local gradient descent through the network from the output to the input with the weights frozen. The first step is to apply the present inputs for both the control variables x(t) and the state variables s(t) into the plant model 54 to generate the predictive output $o^p(t)$. A local gradient descent is then performed on the neural network from the output to the input with the weights frozen by inputting the error E in accordance with the following equation:

$$\vec{\Delta x}(t) = -\eta \frac{\partial E}{\partial \vec{x}} \qquad (6)$$

subject to the constraints F(x), and where E is the error input to the network, described in more detail hereinbelow, and where η is an adjustable "step size" parameter. The output is then regenerated from the new x(t), and the gradient descent procedure is iterated. In an alternate embodiment, input values of x are chosen at random, subject to the constraints F(x) and the value of x that minimizes E is the given as the new control input. As will also be described hereinbelow, these inputs can be varied as a function of the sensitivity.

Figure 4:
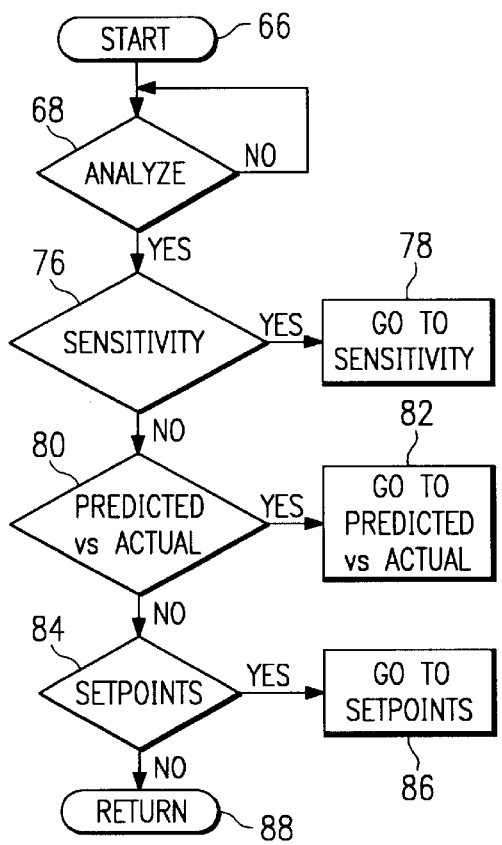
FIG. 4 illustrates a flowchart for the operation of the analyzer at the top level.

Referring now to FIG. 4, there is illustrated a flowchart for the overall operation of the analysis routine by the analyzer 30. The program is initiated at a start block 66 and then proceeds to a decision block 68 to determine whether the analysis operation is to be performed. If not, the program flows back along the "N" path to the input of the decision block 68 and, if so, the program flows along a "Y" path to a decision block 76 to determine if a sensitivity operation is performed. If so, the program flows along a "Y" path to a "Go To" block 78. If the sensitivity operation is not to be performed, the program flows to a decision block along the "N" path to determine if the predictive versus actual operation is to be performed. If so, the program flows along a "Y"

path to a "Go To" function block 82. If not, the program flows along an "N" path to a decision block 84 to determine if the Setpoints operation is to be performed. If so, the program flows a "Y" path to a "Go To" block 86. If not, the program flows along an "N" path to a return block 88.

Predictive versus actual tests are designed to run through data from the plant to determine how accurate the model is when it is presented with the training patterns and novel testing patterns. Sensitivity is designed to determine which variables are the most sensitive for affecting the output variables. The Setpoints operation is designed to allow the user to perform "software designed-experiments" by changing input and output parameters of the models, i.e., manipulate the operating conditions of the models.

Figure 5:
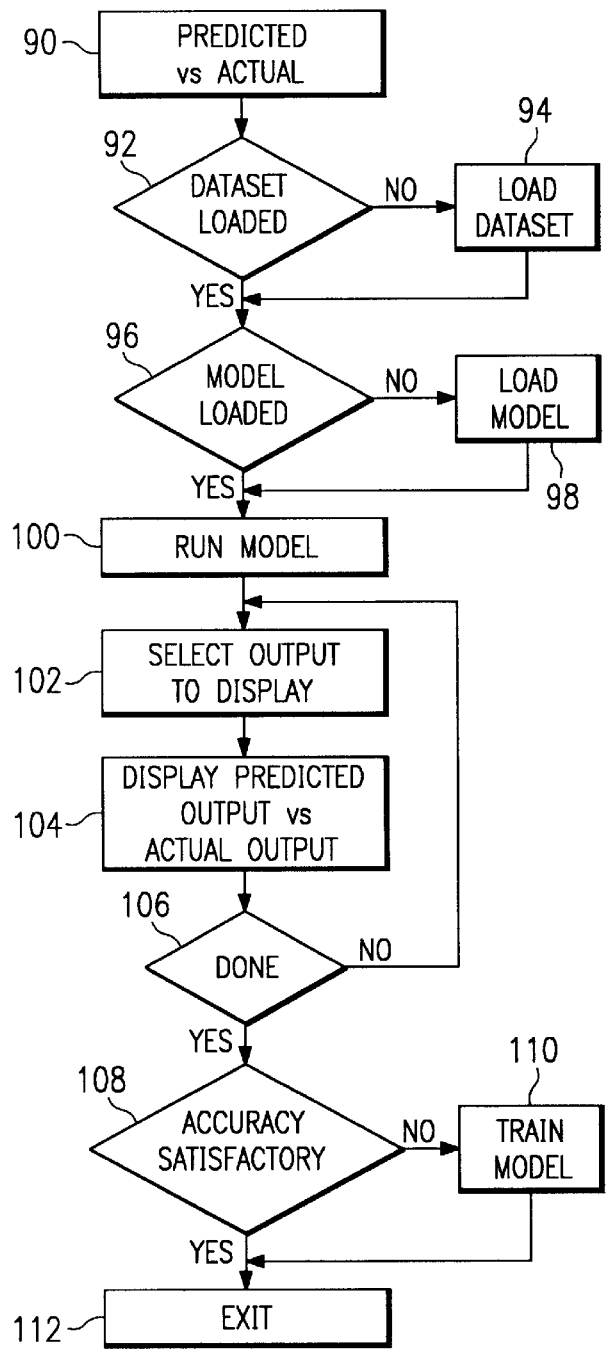
FIG. 5 illustrates a flowchart for generating the display of predicted versus actual output.

Referring now to FIG. 5, there is illustrated a flowchart depicting the operation of comparing the predicted output to the actual output, which is initiated at a block 90, and then the program flows to a decision block 92 to determine if the Dataset is loaded from memory 26. If so, the program flows along an "N" path to a function block 94 to load the Dataset and, if it is not to be loaded, the program flows through a "Y" path, both output paths flowing to the input of a decision block 96 that determines whether the model is loaded. If not, the program flows an "N" path to a function block 98 to load the model and then to the input of a function block 100 to run the model. After the model is loaded, the program flows directly to the function block 100 along a "Y" path. The program then flows to a function block 102 to determine which of the outputs in the output vector $o^p(t)$ is to be displayed. When selected, the program flows to a function block 104 to display the predicted output versus the actual output and then to the input of a decision block 106 to determine if the operation is done. If not, the program flows back to the input of function block 102 to select another display along the "N" path and, if not, the program flows along the "Y" path to a decision block 108 to determine if the accuracy of the prediction is satisfactory. If the accuracy is not satisfactory, this indicates that the model is not accurately trained and the program will then flow along an "N" path to a function block 110 to perform a model training operation, which is not described in this disclosure. The program will then flow to an exit block 112. If the accuracy is satisfactory, the program will flow directly to the Exit block 112 along a "Y" path from decision block 108.

There are two types of sensitivity determinations that can be performed, sensitivity versus rank and sensitivity versus percent change. A sensitive analysis indicates how much effect or influence each input variable has on each output variable. In the prediction model, this includes all input variables. However, in a control model, only the control/external variables are considered, since the outputs are not directly sensitive to state variables. As will be described hereinbelow, one strategy for optimizing a process is to identify the input variables to which the outputs are most sensitive and then optimize them first, this providing the best overall optimization of the process. The less influential variables are then identified and optimized in order to arrive at the best dynamic control of the process.

In the sensitivity versus rank, the sensitivity of the input variables versus the output variables is calculated by taking the distribution-averaged partial derivatives of the output variables with respect to the inputs. Three separate sensitivity measurements can then be computed. These can be the absolute average total sensitivity, the average total sensitivity and the peak sensitivity. The average is over the distribution of patterns specified by the user, and is computed in each of the cases by the following formulas. The average sensitivity is as follows:

$$\text{Average} = Tsens_{ij} = \frac{\sum_{k=1}^{Npats} \frac{\partial o_{k,i}}{\partial x_j}}{Npats} \quad (7)$$

where, $N_{pats}$ is the number of patterns in the Dataset for which the determination is to be computed over, and $o_{k,i}$ is the $i^{th}$ output for the $k^{th}$ pattern and $x_i$ is the ith input for the kth pattern. Similarly, the average total sensitivity, $ATsens_{ij}$ is the sum of the absolute values of the partial derivatives as follows:

$$\text{AverageAbsolute} = Tsens_{ij} = \frac{ATsens_{ij} = \sum_{k=1}^{Npats} \left| \frac{\partial o_{k,i}}{\partial x_j} \right|}{Npats} \quad (8)$$

Finally, the peak sensitivity is the maximum of the partials over all patterns as follows:

$$\text{Peak} = PkSens_{ij} = \max\left( \left| \frac{\partial o_{k,i}}{\partial x_j} \right|, k \in 1, 2 \ldots Npats \right) \quad (9)$$

The sensitivities associated with the average, average absolute and peak are collected for all of the input/output pairs into a table, and they can be viewed in a plot of the sensitivity versus the input variables. It is convenient to sort the variables according to rank and to plot the variables so that the most sensitive variables are to the left, the least to the right. This sorting is for each view, average, average absolute or peak sensitivity. This information, by way of example, is illustrated in Table 1.

TABLE 1

| Rank | Name | Time-Delay | ATsen | Tsen |
|---|---|---|---|---|
| 1 | flow1 | −4 | 1.40 | 1.40 |
| 2 | press1 | 0 | 0.469 | 0.469 |
| 3 | temp1 | −4 | 0.408 | 0.408 |
| 4 | flow2 | 0 | 0.349 | 0.051 |
| 5 | level1 | 0 | 0.281 | −0.260 |
| 6 | press2 | 0 | 0.178 | −0.178 |
| 7 | antifoam | 0 | 0.156 | −0.080 |
| 8 | temp3 | 0 | 0.135 | −0.051 |
| 9 | press3 | 0 | 0.045 | 0.002 |
| 10 | pumpseed | 0 | 0.026 | 0.005 |

Figure 6A:
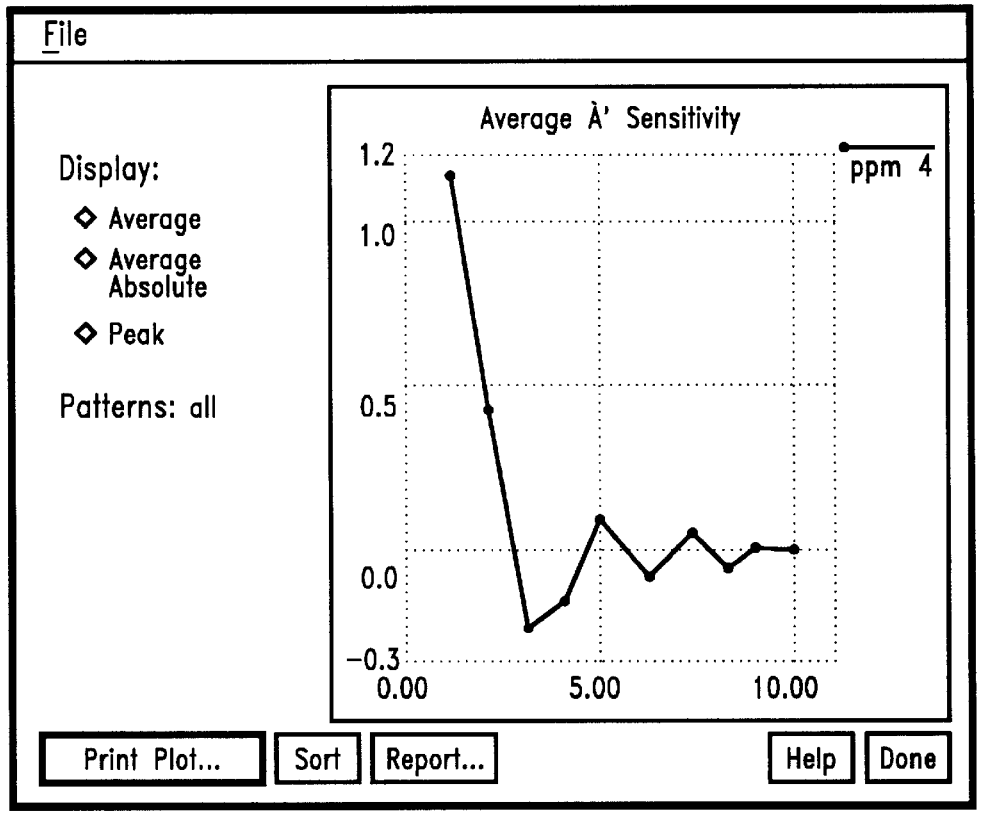
FIGS. 6a, 6b and 6c illustrate plots of average total sensitivity, absolute average total sensitivity and peak sensitivity versus rank.
Figure 6B:
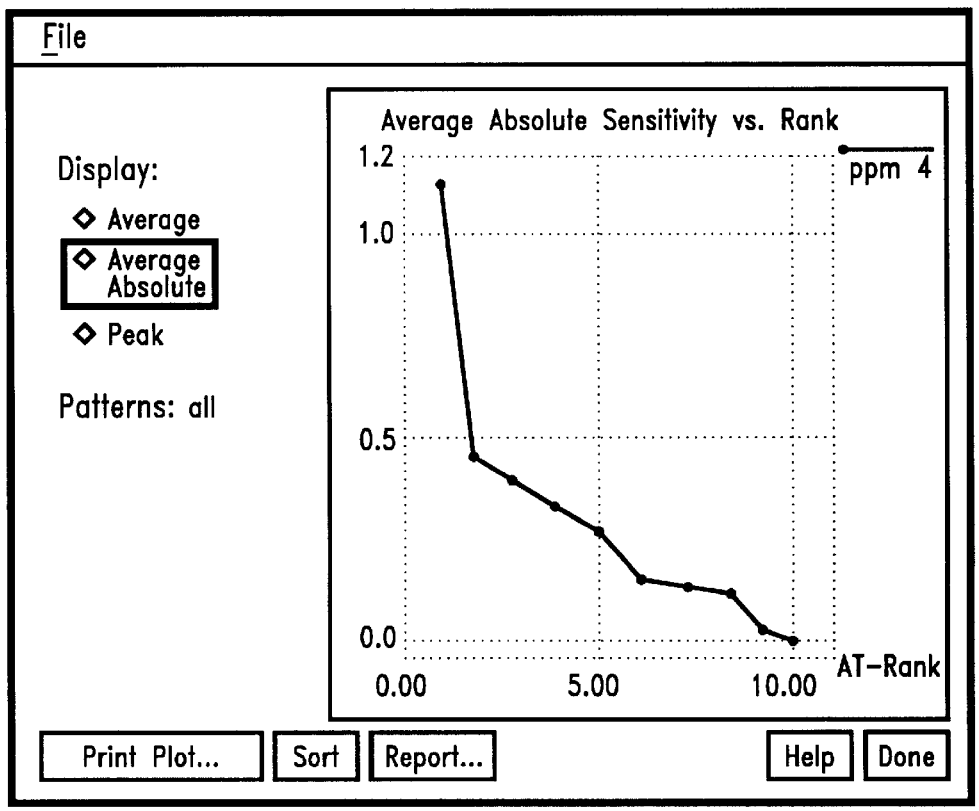
Figure 6C:
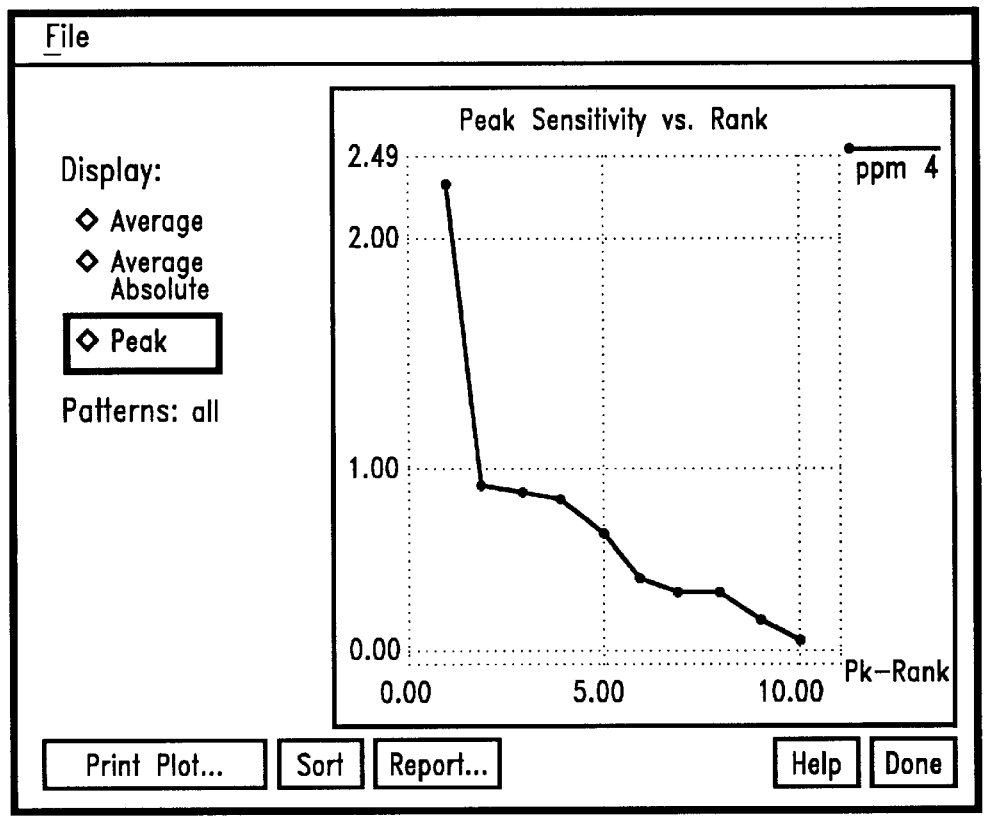

Referring now to FIGS. 6a, 6b, and 6c, there are illustrated plots of the sensitivity versus the rank. This provides a display of selected average sensitivity (Tsen), average absolute sensitivity (ATsen), or peak sensitivity (PkSen). Each line that is plotted corresponds to a single output variable, with four output variables illustrated. The Y-axis is the calculated sensitivity values. Each plotted point on a line represents the output's sensitivity to one input variable. On each line, the inputs are ordered by a magnitude of sensitivity (of whichever type is being displayed); this means that input variables do not necessarily occur in the same order on each line. The X-axis is simply the rank order. To identify the input variable at any particular point in the analysis system, it is only necessary to move a pointing device onto it and push and hold the pointing device; the variable's name, time delay and sensitivity will be shown. The τ value representing the delay associated with the input variable, this being described hereinbelow. If, for example, the peak sensitivity diagram is displayed, the pattern number at which the peak occurred (but not the value) will also be shown.

After the sensitivity analysis has been performed and the sensitivities of the output variables on the input variables has been determined, a sort function can be performed on the input Dataset in order to arrange the columns in the Dataset, such that input variables are in the order of their influence on any one output variable. In general, sorting is always done in the order of Average Absolute Sensitivity, regardless of which type of sensitivity is being displayed. If the model has only one output variable, sorting is done on an immediate basis. Otherwise, it is necessary to select a given one of the output variables prior to sorting and then the Dataset will be sorted according to the selected output variable sensitivity to the input variables. As such, the Dataset will then be sorted in accordance with the selected output variable.

If an input variable in the model has multiple time delays associated therewith, it is sorted according to the largest sensitivity in any time delay. As will be described hereinbelow, each input variable can be input to the model with various time delays, such that each input variable can in effect constitute multiple input variables to a system model. In this manner, the time delay of a variable can be utilized to determine the sensitivity of the output on that input variable at the appropriate time delay.

The average sensitivity is the average change of the output variable as the input variable increases from its minimum to its maximum value. A positive Average Sensitivity value indicates that, on average, the output value increases as the input variable increases. A negative Average Sensitivity value indicates that, on average, the output value decreases as the input value increases. Average Absolute Sensitivity is the average of the magnitude (absolute value) of the change of the output variable as the input variable increases from its minimum to its maximum value. (Note that this is not necessarily the magnitude of the average.) Thus, Average Absolute Sensitivity is always positive, and is greater than or equal to the magnitude of Average Sensitivity. Average Absolute Sensitivity, therefore, gives a general indication of the strength of the influence of an input on an output. Combined with Average Sensitivity, the Average Absolute Sensitivity can be utilized as an indication of whether the input/output relationship is linear, monotonic, or without a causal connection.

Figure 7A:
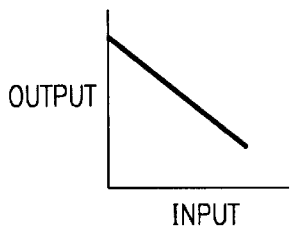
FIGS. 7a, 7b, 7c and 7d illustrate plots of various examples of X–Y plots of an input and an output variable over the extent of their range.
Figure 7B:
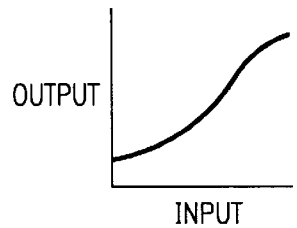
Figure 7C:
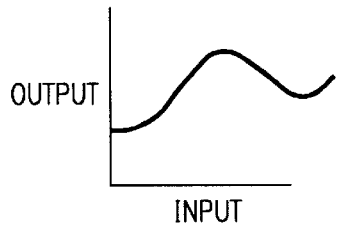
Figure 7D:
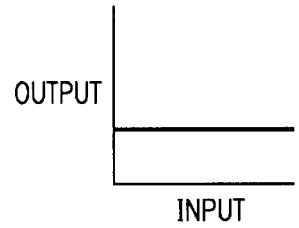

Referring now to FIGS. 7a, 7b, 7c and 7d, there are illustrated plots of various illustrations of examples of X–Y plots of an input and an output variable over the extent of their range, with the corresponding sensitivity relationships indicated. In FIG. 7a, the output decreases in a linear, monotonic manner with respect to the input. In FIG. 7b, the output increases in a non-linear, monotonic manner as a function of the input. In both FIGS. 7a and 7b, the Average Absolute Sensitivity is equal to the absolute value of the Average Sensitivity, which value is not equal to zero. In FIG. 7c, it can be seen that the output varies in a non-linear, non-monotonic manner as a function of the input. The Average Absolute Sensitivity is therefore greater than the absolute value of the Average Sensitivity. In FIG. 7d, the output does not change as a function of the input and, therefore, exhibits no causal relationship to the input. In this manner, the Average Absolute Sensitivity is equal to the Average Sensitivity which are both equal to zero.

In FIGS. 7a and 7b, both relationships are monotonic; that is, the output variable does not change direction as the input variable increases. However, the relationship does not necessarily have to be linear, since strong non-linearities can exist over small ranges of the input. The degree of non-linearity can be determined utilizing the sensitivity versus percentage analysis described herein. If the relationship is a non-monotonic relationship, and therefore non-linear, the greater the inequality, the greater the non-linearity.

Referring further to the calculations of Table 1, it is noted that they are averaged over distributions, but if the input/output relationships are quite non-linear, then this non-linearity is often not fully displayed in the average or peak relationship computed in Table 1; thus, it is very useful to compute the sensitivity as a function of the range of the input data. For this computation, the sensitivity is computed for several different input values in the range of each input variable. For each input variable, several inputs are created as a function of the range of the input, ranging from 0% to 100%. This step is performed holding the values of the other variables constant. For each variable "x", twenty different ranges are computed and the partials at each of the k input values would be as follows:

$$\frac{\partial}{\partial x_k} o(x) \bigg|_{x_k} = \frac{\partial}{\partial x_k} o(x) \bigg|_k ; x_1, x_2, x_{j \in k} \ldots x_{N_{in}} = \text{Constant} \quad (10)$$

where $N_{in}$ is the number of input variables and the other x; are held constant at their mean peak values for $j \neq k$.

Figure 8:
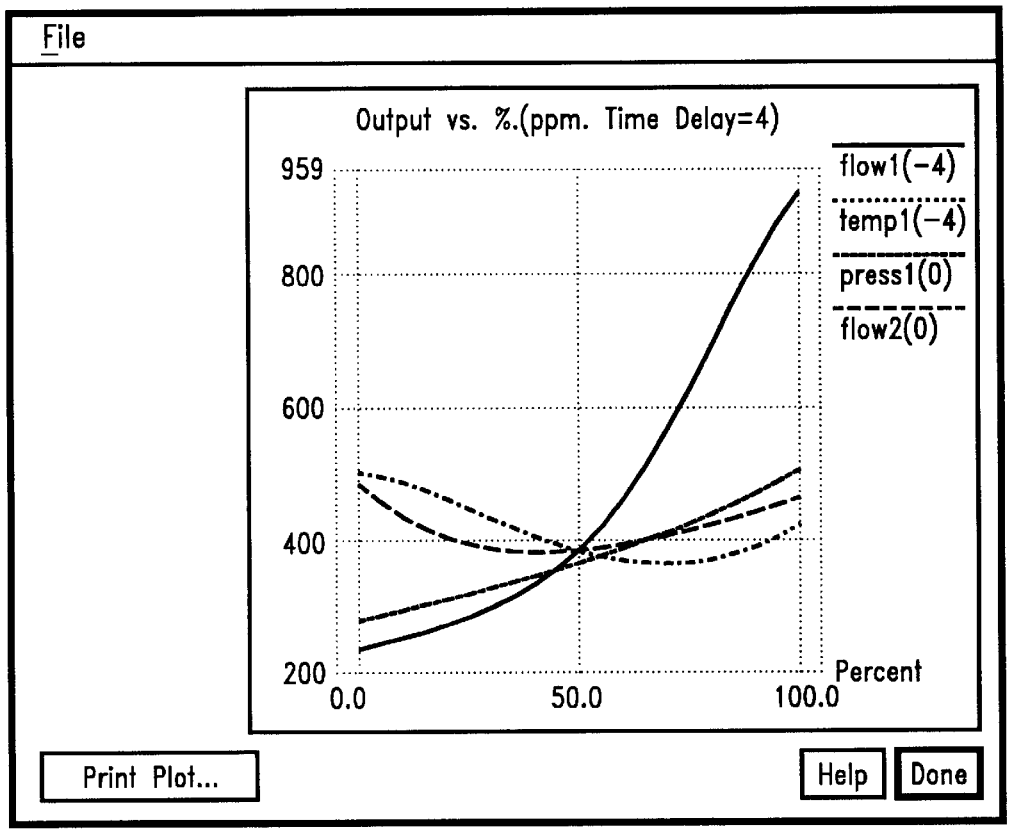
FIG. 8 illustrates a plot of sensitivity versus output for select outputs.

The Sensitivity vs. Rank data collapses the sensitivity information into a single number for each input variable (Average Sensitivity), whereas the Sensitivity vs. Percentage of Range data illustrates the details of how sensitivity varies across the range of each input variable. Unlike the Sensitivity vs. Rank data, this detail allows the user to distinguish whether a monotonic variable is linear or non-linear, the extent of the non-linearities and at what input values the sensitivity is at its maximum or minimum. Sensitivity vs. Percent calculations are only made for one output variable at a time. Once calculations are complete, the information can be displayed. A sample of this display is illustrated in FIG. 8, which comprises a plot of Sensitivity vs. Percent. This illustrates three plots for three separate output variables. All plots are calculated for one output variable that was selected in a previous operation. Each line considers an input variable over the extent of its range in the Dataset (over all patterns). The X-axis shows the percentage of the input variable's range: 0% is the variable's minimum value in the Dataset; 100% is the variable's maximum in the Dataset.

Figure 8A:
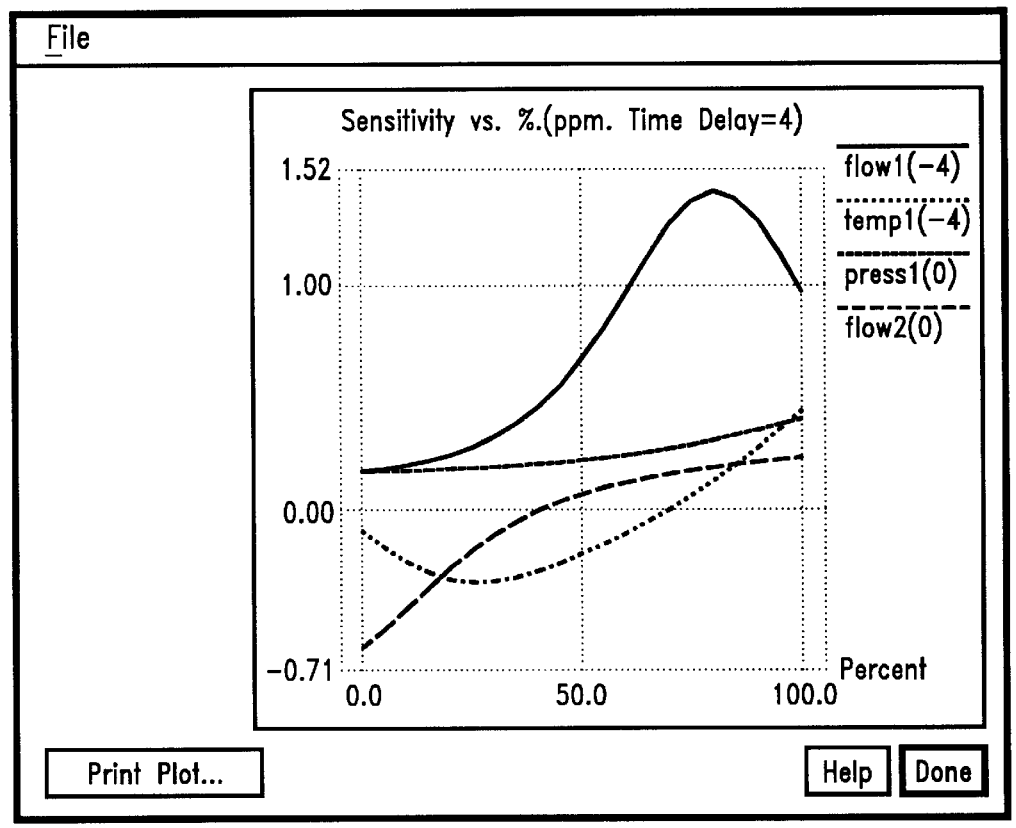
FIG. 8a illustrates a plot of sensitivity versus percentage for select outputs.

The points in the plot at FIGS. 8 and 8a are plotted at intervals of 5% of each input variable's range. On each line, that input is held at its particular percentage of its range, whereas all of the other model variables are held at their average. The output (FIG. 8) or the partial derivative (FIG. 8a) of the output versus the input at that point can then be calculated. Values on the Y-axis show the output variable's sensitivity to the input variable when the input variable is at each different step within its range.

Figure 9:
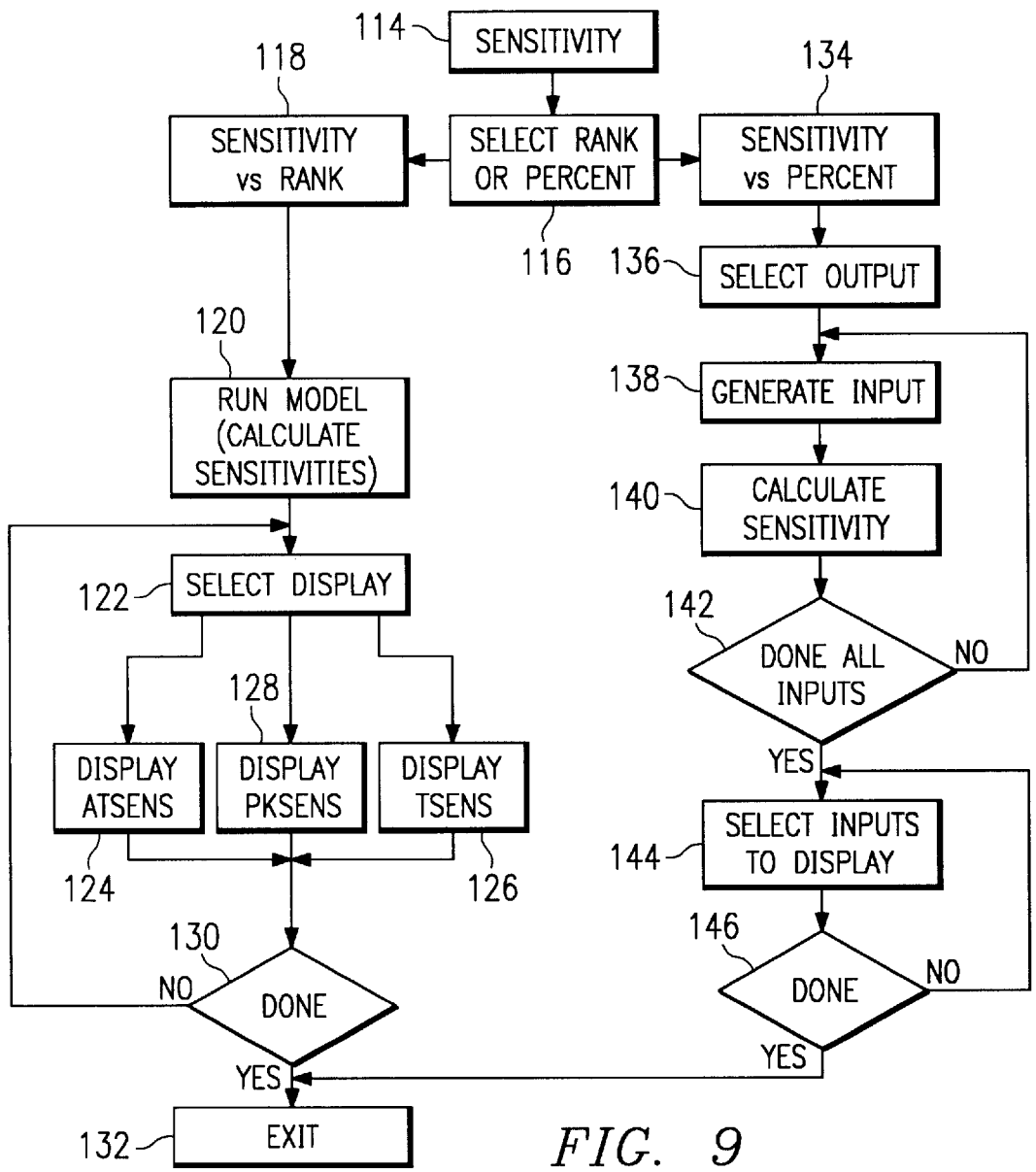
FIG. 9 illustrates a flowchart for determining the sensitivity.

Referring now to FIG. 9, there is illustrated a flowchart depicting the sensitivity operation, which is initiated at a function block 114. The program then flows to a function block 116 that selects rank or percent. If rank is selected, the program flows along a branch to a function block 118 to perform the Sensitivity versus Rank operation. Then, the program flows to a function block 120 to run the model and calculate the Sensitivities. The program then flows to a function block 122 to select the type of display, Average Absolute, Average or Peak. If the Average Absolute is selected, the program flows to a function block 124. If the Average Sensitivity is to be displayed, the program flows along a branch to a function block 126 and, if the Peak Sensitivity is to be displayed, the program flows along a branch to a function block 128. After the display has been selected, the output of all the blocks 124–128 flow to the input of a decision block 130 to determine if the Sensitivities have been displayed. If not, the program flows along an "N"

path back to the input of block 122 and, if so, the program flows along a "Y" path to an Exit block 132.

If percent has been selected in the block 116, the program flows along a branch to a function block 134 to initiate the program for the Sensitivity versus Percent operation. The program then flows to a function block 136 to select the desired output from among the outputs associated with the output vector, which output is the predictive output $o^P(t)$. The program then flows to a function block 138 to generate the inputs and then to a function block 140 to calculate the Sensitivity. The program then flows to a decision block 142 to determine if all the inputs have been processed. If not, the program flows back to the input of function block 138 along an "N" path. After completion, the program flows from decision block 142 along the "Y" path to the input of function block 144 to select the inputs to display and then to the input of a decision block 146 to determine if the operation is completed. Once completed, the program flows from decision block 146 along the "Y" path to the input of the Exit block 132.

In addition to determining how sensitive the variables are, the analyzer 30 also has the ability to determine how these variables will affect the output of the plant 10 as their values change. This is facilitated by the "Setpoints" and "What Ifs" tool, wherein the outputs are determined as a function of the user-supplied and modified inputs given certain constraints. Once a trained system model is loaded, the user can then change input values to predict outputs as a function of changing inputs. This can be done under different constraint conditions. In this mode, the user can constrain inputs to not range outside given conditions, clamp inputs to certain values, and compute the predicted output value along with an estimate of its prediction error for a given set of inputs. This error function is referred to as the "confidence value", which is not the subject of the present application, but was disclosed in U.S. Pat. No. 5,613,041, issued Mar. 18, 1997, and entitled "Method and Apparatus for Operating a Neural Network with Missing or Incomplete Data".

The inputs are assumed to be independent variables in a standard model, and can be set and constrained according to the user's discretion. In this case, the output of a model, $o^P(x)$ is a function, $f(x)$, that is learned by the neural network model. The input values of $x(t)$ are given by the user, as well as the constraints on $x(t)$. The constraints are of three types: constraints on the absolute range of the values, constraints on the time rate-of-change of the values, and combinatorial constraints on the variables. However, other constraints could be implemented. The absolute constraints are implemented simply as:

$$x_i = \begin{cases} x_{lower_i}; x_i < x_{lower_i} \\ x_i \\ x_{upper_i}; x_i > x_{upper_i} \end{cases} \quad (11)$$

where, $x_{lower_i}$ and $x_{upper_i}$ are the lower and upper hard-constraints on the ith input value $x_i$, respectively. This relation says to replace $x_i$ with its lower or upper constraint value if it ranges outside the constraint.

Similarly, for time-dependent values, the time-rate-of-change on the values can be viewed as the difference, or "delta" of the values, $\Delta(x)=x(t)-x(t-1)$, where $x(t)$ is the value of x sampled at time t and $x(t-1)$ is the value of x sampled at one time-step in the past, where all of the data is on a constant, pre-determined time interval. For these delta values, the delta constraints can be implemented as follows:

$$\vec{x}(t) = \begin{cases} \vec{x}(t-1) + \Delta \vec{x}_{lower}; \vec{x}(t) - \vec{x}(t-1) < \Delta \vec{x}_{lower} \\ \vec{x}(t) \\ \vec{x}(t-1) + \Delta \vec{x}_{upper}; \vec{x}(t) - \vec{x}(t-1) > \Delta \vec{x}_{upper} \end{cases} \quad (12)$$

This equation says that the time-rate-of-change, or delta-values of the inputs can never exceed the delta constraints.

Combinatorial constraints are used to satisfy limits on the combinations of variables. These constraints are "hard" in the sense that they reflect physical constraints in the operation of the plant. For example, just as it is required that the sum of the currents into a node of a circuit is equal to the sum of the currents out of the node, so it is in a plant. The sum of the flows into a section of the plant must be equal to the sum of flows out of that same section. This type of constraint is often referred to as "mass balance" or "material balance" requirements, and can be expressed as $F_i(x)=C_i$, meaning that some function $F_i(x)$ of the inputs x is equal to a constant, $C_i$. Other common requirements are "heat balance", meaning the energy in equals the energy out, etc. These also can be expressed as $F_i(x)=C_i$.

To implement combinatorial constraints as a filter on the inputs, it can implement it in a manner very similar to the range constraints, pulling the variables back into their constrained values any time they stray outside of the specified constraint. For example, solve the equation:

$$F_i(x_1, x_2, \ldots x_k, \ldots x_n)=C_i \quad (13)$$

for a particular $x_k$, i.e.:

$$x_k=G_i(C_i, x_1, x_2, \ldots x_n) \quad (14)$$

and set all of the $x_i$ for $i \neq k$ to the values output by the inverse model and then set:

$$x_k=G_i(C_i, x_2 \ldots x_k) \quad (15)$$

This will satisfy the constraint $F_i(x)=C_i$ and provide most of the values (except for the kth one) so as to minimize the cost.

Figure 10:
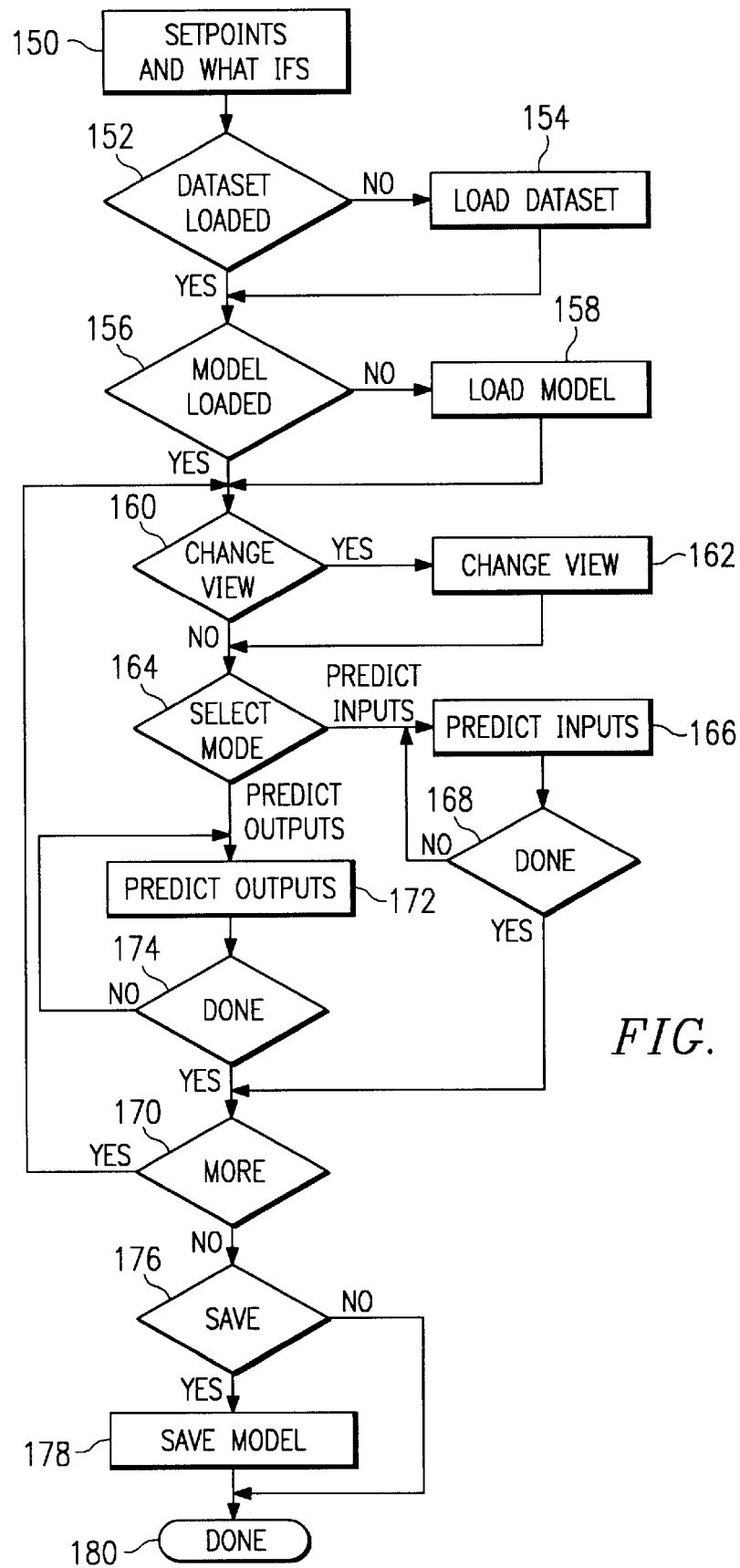
FIG. 10 illustrates a flowchart for displaying setpoints and "what ifs"

Referring now to FIG. 10, there is illustrated a flowchart depicting the operation of initiating the Setpoints and What-Ifs operation, which is initiated at a start block 150 and then proceeds to a decision block 152 to determine if the Dataset is loaded. If not, the program flows along an "N" path to a function block 154 to load the Dataset and then to the input of a decision block 156. If the Dataset is already loaded, the program flows directly to the decision block 156. The decision block 156 determines whether the model is loaded. If not, the program flows to a function block 158 to load the model and then to the input of a decision block 160. If the model is already loaded, the program flows directly to the decision block 160. Decision block 160 determines whether the view needs to be changed. If yes, the program flows to a function block 162 to change the view and then the input of a decision block 164. If the view does not need to be changed, the program flows directly to the input of a decision block 164. The decision block 164 determines which mode is selected, the Predict Inputs mode or the Predict Outputs Mode. If it is the Predict Inputs mode is chosen, the program flows to a function block 166 to predict the inputs and then to a decision block 168 to enter a loop until the inputs are predicted. After prediction of the inputs, the program flows along a "Y" path to the input of a decision block 170 to determine if more analysis is required. If so, the program flows along a "Y" path back to the input of decision block 160.

If the Predict Outputs path is chosen from decision block 164, the program flows to a decision block 172 to perform the output prediction. The program then flows to a decision block 174 to enter a Do loop until the output prediction is complete, after which it flows from decision block 174 along the "Y" path to the input of decision block 170.

After the analysis is complete, the program flows from decision block 170 along the "N" path to the input of a decision block 176 to determine if the model parameters are to be saved. If so, the program flows to a function block 178 to save the model and then to a Done block 180. However, if it is not to be saved, it flows directly to the Done block 180.

Figure 11:
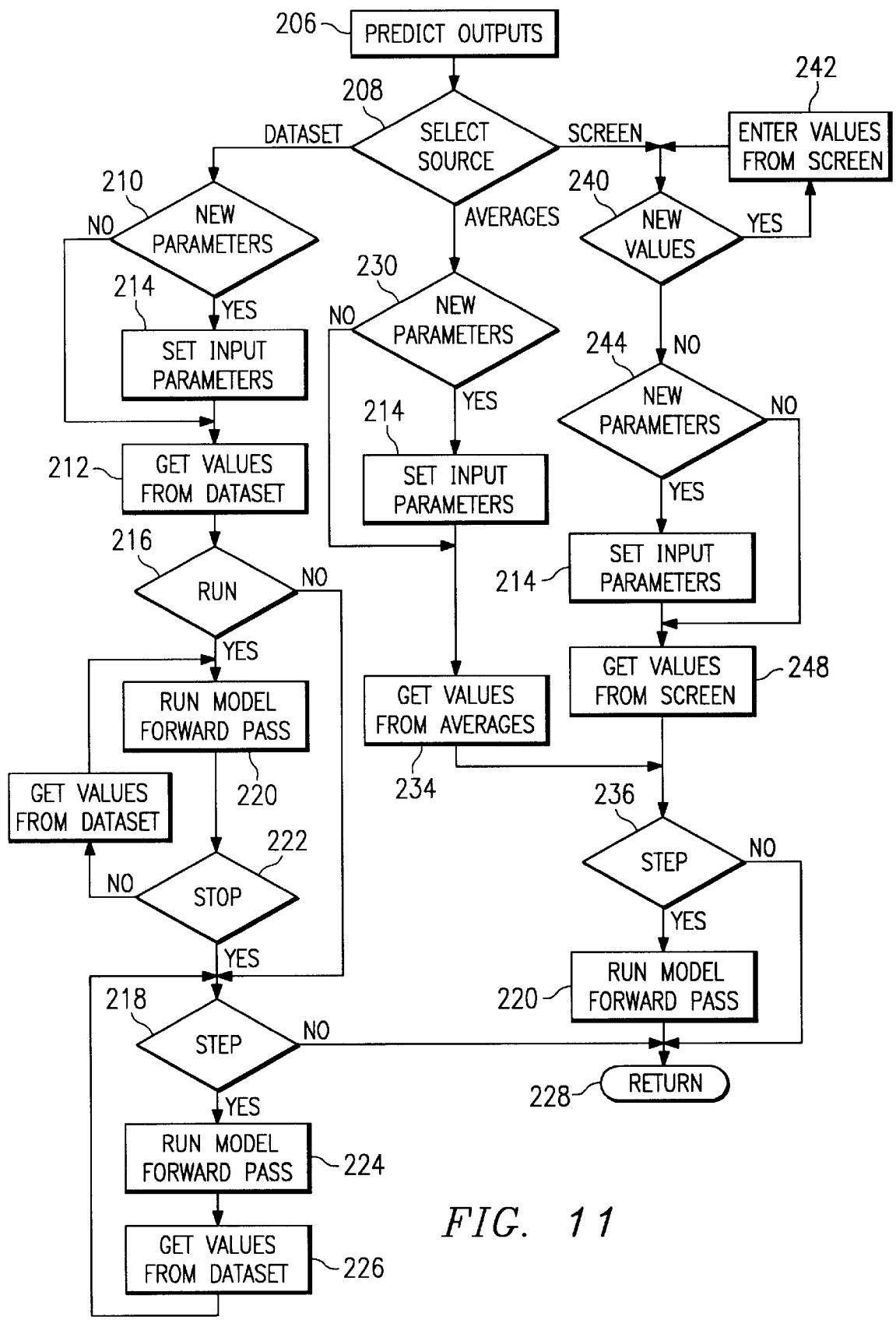
FIG. 11 illustrates a flowchart for changing the predict-outputs mode of setpoints and "what ifs"

Referring now to FIG. 11, there is illustrated a flowchart for the operation wherein the outputs are predicted, which is initiated at a block 206 and then flows to a decision block 208 to determine which of three branches is selected to determine the source. These can be either the Dataset, the averages of the dataset, or the screen. If the Dataset branch is chosen, the program flows to a decision block 210 to determine if new parameters are required. If not, the program flows to the input of a function block 212 and, if so, the program flows to a function block 214 to set the input parameters and then to the input of function block 212. Function block 212 is the operation wherein the values are retrieved from the Dataset which, after retrieval, the program will then flow to a decision block 216 to determine whether the program is to be run. If not, the program will flow to the input of a decision block 218. However, if the outputs are to be predicted using the Dataset, the program flows to a function block 220 to run the model in a forward pass and then to a decision block 222 to determine if the forward pass is to be stopped. If not, more values are fetched from the database and then the program proceeds back to the input of function block 220. However, after the model has been run in the forward pass with all the data, the program flows from the decision block 222 to the input of decision block 218. Decision block 218 determines whether the step function has been selected from the graphics buttons 196. If so, the program flows to a function block 224 to run the model in a forward pass and then to a function block 226 to get additional values from the Dataset and then back to the input of decision block 218 to wait for the next step. Once this is completed, the program flows to a return block 228.

If the Averages path has been selected from decision block 108, the program flows to a decision block 230 to determine if new parameters are required. If so, these parameters are set, as indicated by a function block 214, and then the program flows to a function block 234. If no constraints are required, the program flows directly to the function block 234, which function block 234 then fetches the value from the dataset averages, which were determined in the training operation. The program then flows to the input of a decision block 236 to determine if the Step button in the graphics buttons group 196 has been selected. If not, the program flows to the input of the return block 228 and, if so, the program flows to a function block 238 to run the model in the forward pass, i.e., to perform a prediction, and then to the return block 228.

If the Screen source had been selected at decision block 208, the program would flow to the input of a decision block 240 to determine if new values are required. If yes, the program flows to a function block 242 to receive the values from the screen, these input by the user. The program would continue in a loop back to the input of decision block 240 until all values were entered and then would flow to a decision block 244 to determine if new parameters are required. If so, the program flows to a function block 214 to set the constraints and then to the input of function block 248. If no new parameters are required, the program flows directly to function block 248, wherein the values input by the screen are then retrieved and the program flows to the input of decision block 236 to run the model.

Figure 12:
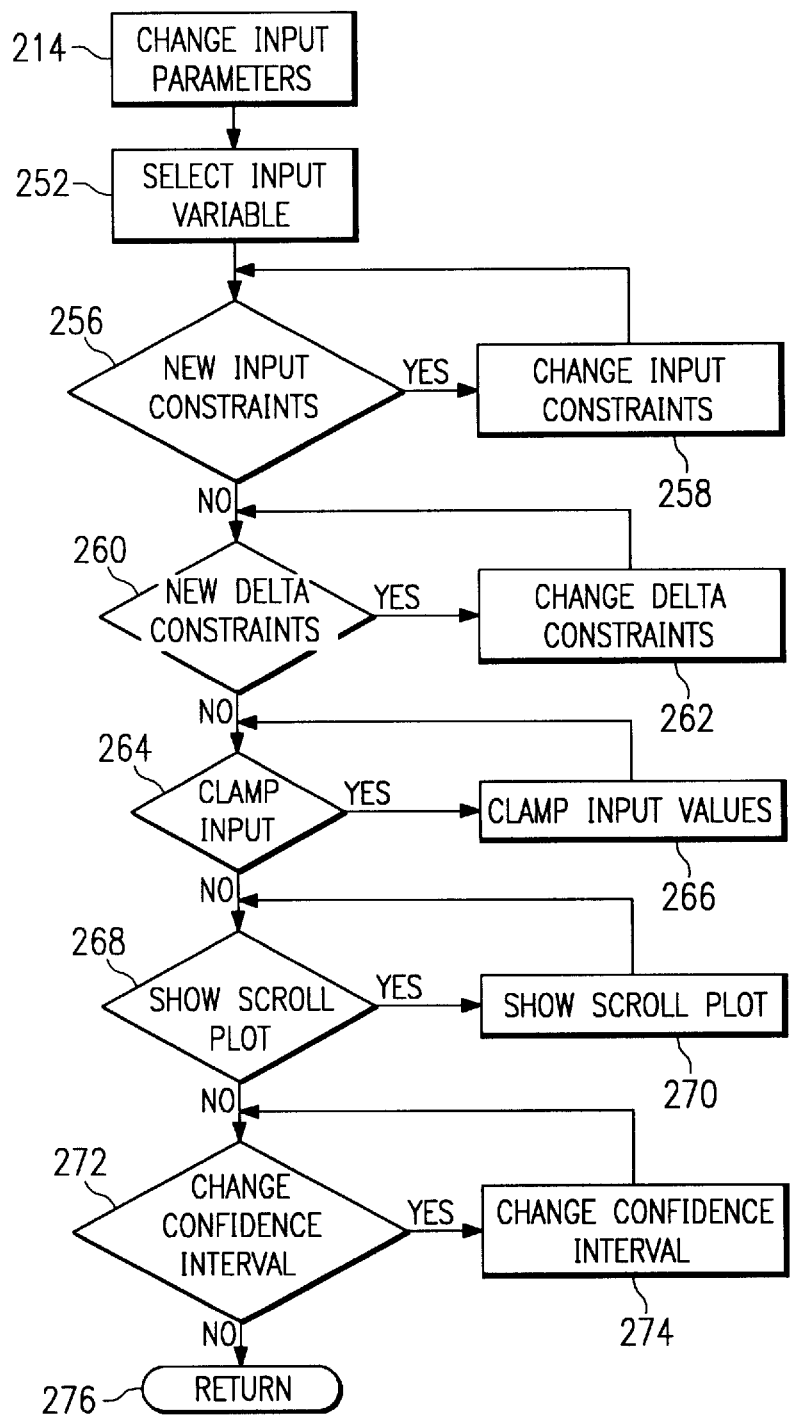
FIG. 12 illustrates a flowchart for changing input parameters.

Referring now to FIG. 12, there is illustrated a flowchart depicting the operation wherein the input parameters are changed, which is initiated at a function block 214 and then flows to a function block 252 to select the input variables. The program then flows to a decision block 256 to determine if new input parameters are required. If so, the program flows to a function block 258 to change the input parameters and then back to the input of block 256. If no constraints are required, the program flows to the input of a decision block 260 to determine if a new delta constraint is required. If so, the program flows to a function block 262 to change the delta constraints (rate-of-change constraints) and then back to the input of block 260. If no new delta constraints are required, the program flows to the input of a decision block 264 to determine if the inputs should be clamped. This operation indicates that the input values should not change. If so, the program flows to a function block 266 to perform the clamping operation and back to decision block 264. If the inputs are not to be clamped, the program flows to the input of a decision block 268 to determine if the Scroll Plot should be illustrated. If so, the program flows to a function block 270 to turn on this feature and then back to the input of function block 268. If the Scroll Plot is not to be displayed, the program flows to the input of a decision block 272 to determine if the Confidence Interval is to be changed. As described above, this is associated with the error of the predicted value, which is the subject of another and pending application. However, if the Confidence Interval is to be changed, the program flows to a function block 274 to change the Confidence Interval and then back to block 274. If the Confidence Interval is not to be changed, the program flows to a return block 276.

Additionally, rate-of-change constraints (delta constraints) can be provided by inputting two values, a max-decrement and max-increment. The decrements are set in accordance with the following equations:

$$x_{LCI} \leq x_i \leq x_{UCI}, \Delta_{CLI} \leq x_i(t+1) - x_i(t) \leq \Delta_{CUI} \qquad (16)$$

where:

$\Delta_{CLI}$=Max–Decrement $\Delta_{CUI}$=Max–Increment

As can be seen from the above equations for the rate of change constraints, the amount that the input variable can change for each "Step" through the network will be set. This provides for an additional level of control over the predicted control variables. For example, if it is desirable to change a flow setting, the control input device, such as a valve, is not immediately changed to a new setting but, rather, it is incrementally changed.

Figure 13:
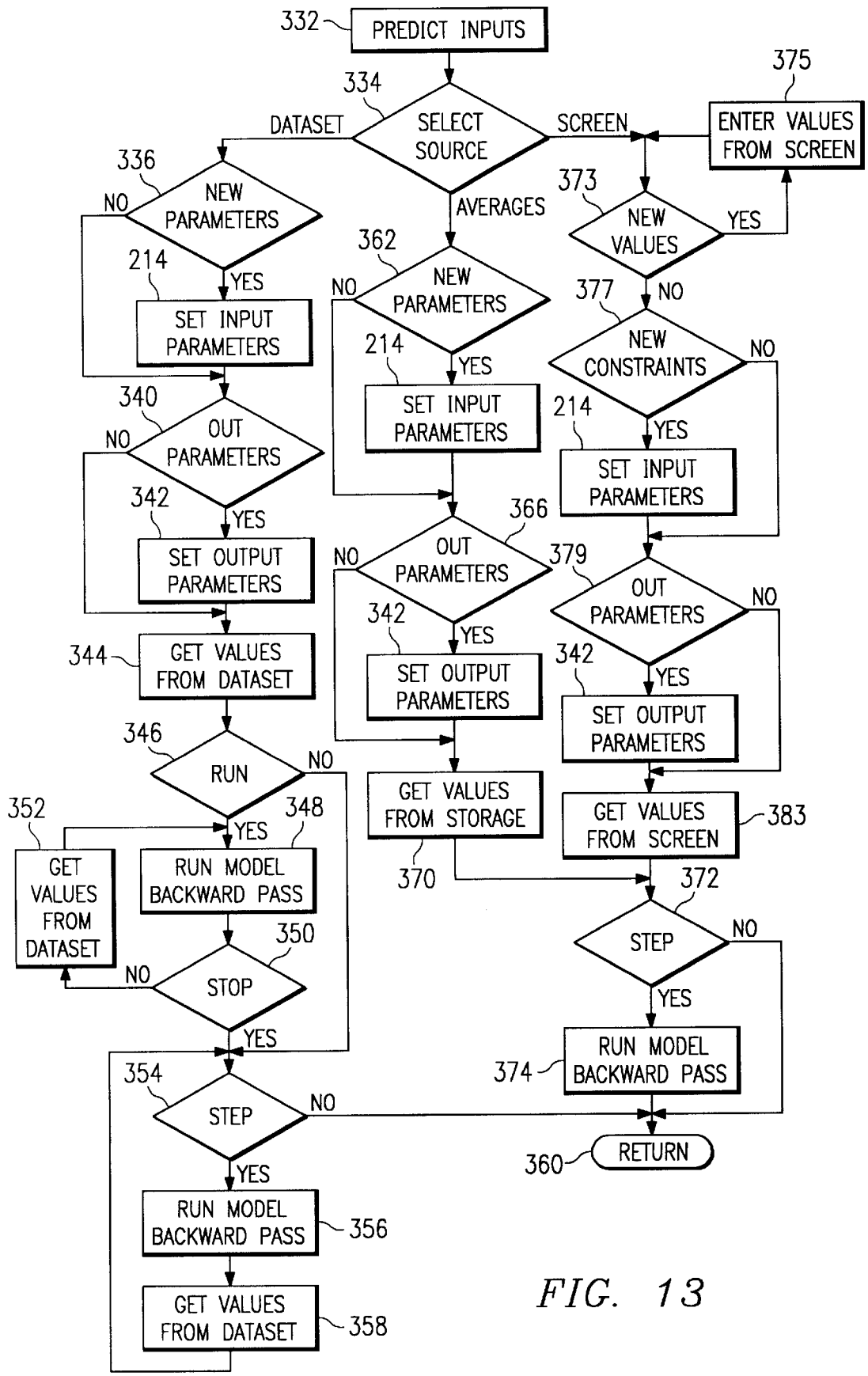
FIG. 13 illustrates a flowchart for predicting the inputs.

Referring now to FIG. 13, there is illustrated a flowchart for the operation wherein the inputs are predicted, which is initiated at a function block 332 and then flows to a decision block 334 to determine one of three branches from which to select the source, the Dataset, the averages or the screen. If the Dataset is chosen, the program flows to a decision block 336 to determine if new parameters are to be applied, and if so, the program flows to a function block 214 to set the constraints and then to a decision block 340. If not, the program flows directly to the decision block 340, decision block 340 determining whether the output parameters are to be set. If so, the program flows to a function block 342 to set the output parameters and then to a function block 344. If the output parameters are not to be set, the program flows directly to the function block 344, the function block 344 denoting the operation wherein the values are obtained from the Dataset in the memory 26. The program then flows to a decision block 346 to determine whether the run operation has been activated. If so, the program flows along a "Y" path to a function block 348 to run the inverse model (run model in a backward pass) and then to a function block 350 to determine if the step operation has been selected. If not, the program flows to a function block 352 to get additional values from the Dataset and then back to the input of the function block 348 to continue the Run operation. This will continue until a Stop function has been indicated, after which the program will flow to a decision block 354 to determine if the Step operation has been selected. If so, the program will flow to a function block 356 to run the model in a backward pass and then to a function block 358 to obtain additional values and back to the input of the decision block 354 to wait for the next step. If another Step is not selected and the program is halted, the program flows to a Return block 360.

If the source is the averages database, which is determined in the sensitivity operation, the program will flow to a decision block 362 to determine if new parameters are to be selected. If so, the program flows to a function block 214 to set the input parameters, and then to a decision block 366. If not, the program flows directly to the decision block 366, which decision block 366 determines if the output parameters are to be set. If so, the program flows to a function block 342 to set the output parameters and then to a function block 370 to get the values from the area in storage wherein the values are stored after processing through the training operation. If the output parameters are not to be selected, the program will flow directly to the function block 370. After the values have been retrieved, the program flows to the input of a decision block 372 to determine if the Step function has been selected. If not, the program flows to the Return block 360. However, if the Step operation is to be utilized, the program will flow to a function block 374 to run the model in a backward pass and then to the Return block 360.

If the source is the screen, the program flows from decision block 334 along the "SCREEN" path to a decision block 373 to determine if new values are required. If yes, the program flows through a loop including a function block 375 to enter values from the screen and then back to the input of decision block 373. If no new values are required, the program flows to a decision block 377 to determine if new parameters are required. If not, the program flows to the input of a decision block 379 and, if so, the program flows through a function block 214 to set the input parameters and then to the input of the decision block 379. The decision block 379 determines whether output parameters are to be entered. The program then flows to a function block 383 to get the value from the screen. If output parameters are to be input, the program flows to a function block 379 to set the output parameters and then to the function block 383. After the values are obtained from the screen, the program flows to the decision block 372.

Figure 14:
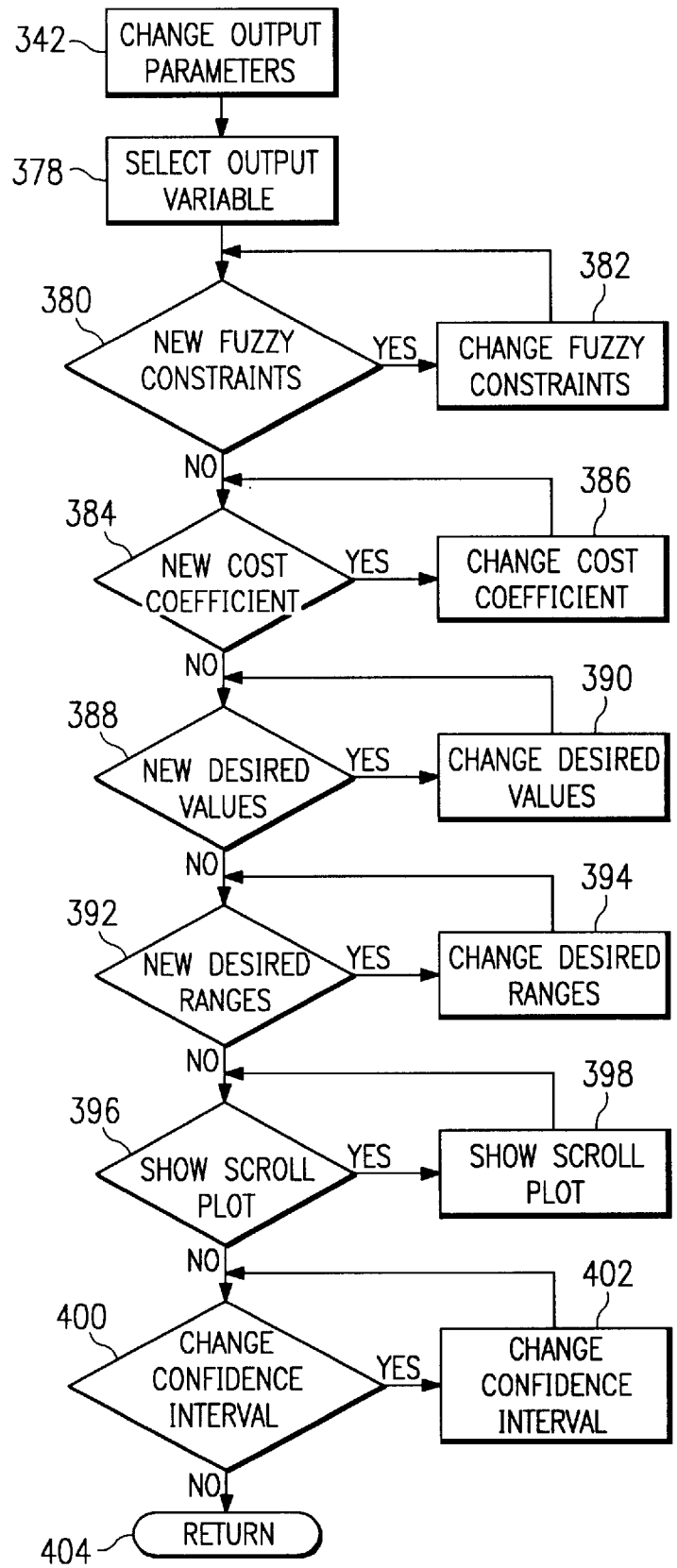
FIG. 14 illustrates a flowchart for changing the output parameters.

Referring now to FIG. 14, there is illustrated a flowchart depicting the operation wherein the output parameters are changed, which is initiated at the block 342 and then flows to a block 378 to select the output variable and then to a decision block 380 to determine whether the fuzzy-constraints are required. If so, the program flows to a function block 382 to change the fuzzy-constraints and then back to the input of decision block 380 until all fuzzy-constraints are changed and then the program flows to a decision block 384, where it is determined whether new cost coefficients are required. If so, the program flows to a function block 386 to change the cost coefficients and then back to the decision block 384 until all cost coefficients have been changed. The program then flows to a decision block 388 to determine if new desired values are required. If so, the program flows to a function block 390 to change the desired values and then back to the input of decision block 388 until all desired values are changed. The program will then flow to a decision block 392 to determine if new desired ranges are required. If so, the program flows to a function block 394 to change the desired ranges and then back to the input of decision block 392 until all desired ranges have been set. The program will then flow through a decision block 396 to determine if the Scroll Plot is to be illustrated. The Scroll Plot is a plot wherein the predicted output is displayed against the actual target value or the predicted values without the constraints on the various output parameters. If so, the program flows to a function block 398 to display the Scroll Plot and then back to the input of decision block 396. After it has been displayed, the program flows to a decision block 400 to determine if the Confidence Interval should be changed. If so, the program flows to a function block 402 to change the Confidence Interval and then back to the decision block 400 until it has been changed, after which the program flows to a return block 404.

The input, as described above, determines how the manufacturing process is to operate. Often, in a manufacturing process, it is useful to determine the appropriate inputs to achieve a desired output criterion. This is to be distinguished from forcing the plant to a desired output. By achieving a desired output criterion, one can determine how the plant operates within these certain criterion. For example, a user may wish to increase the yield of a certain production, decrease the energy consumption, decrease the pollutants or impurities, etc. To achieve these targets, or desired operational properties, the user must provide information as to what the desired behavior of the plant is. The model of the plant is then "inverted" to predict the inputs that would achieve the desired output. In a sense, this provides a determination of the proper "recipe" for the process. For a steady-state solution, this is referred to as process optimization. If this optimality condition is satisfied in an on-line manner, then this determination and implementation is referred to as Process Control.

In general, the desired behavior can be an arbitrarily complicated function of the inputs and outputs. That is, one can write an optimality function or a cost-function that describes the desired behavior of the plant in terms of the actual output of the plant $y_i(t)$, the inputs of the plant $x_j(t)$ and the cost-function parameters $C_k$. This is referred to as a cost function, which can generally be stated as follows:

$$E_{cost} = \sum_{k=1}^{Npats} F(\vec{y(x)}, \vec{x}, \vec{C}) \quad (17)$$

Where $E_{cost}$ is the total cost, F( ) is the cost function and $N_{pats}$ is the number of patterns the total cost is evaluated over. Since the actual outputs of the plants are not available during the analysis run, they must be predicted with the model, i.e., it is assumed that the model realized with the neural network is an accurate model, $y(x)=o(x)$. With this predicted output value, the cost function can be written as follows:

$$E_{cost} = \sum_{k=1}^{Npats} F(\vec{o(x)}, \vec{x}, \vec{C}) \quad (18)$$

In the preferred embodiment, an explicit cost function can be written to satisfy different criterion. However, it should be understood that multiple criteria could be utilized to modify or modulate the process. In the preferred embodiment, the cost function is divided into different pieces for each criteria as follows:

$$E_{cost,k} = E_{1,k} + E_{2,k} + \ldots E_{1,k} \quad (19)$$

where, each of the terms $E_{m,k}$ is the mth error function term for the mth cost criterion associated with the mth property of the plant, for the kth pattern.

Explicitly, to achieve the desired value $d_i$ on an output or predicted state variable $o_i$, the first cost criterion can be written as the following:

$$E_1 = \sum_{i=1}^{Nout} E_{1,i} = \sum_{i=1}^{Nout} \lambda_i f_i(o_i) (o_i(\vec{x}) - d_i)^2 \quad (20)$$

Where the sum is over the number of outputs $N_{out}$. This term has a cost-coefficient $\lambda_i$ so that each output can be weighted differently for different desired properties, and a "fuzzy-cost-coefficient", $f_i(o_i)$, described below, that allows the use of the desired-ranges. This function $E_1$ will be minimum if all of the output variables equal their desired values. Note that additional desired values can be associated with the input variable as well. In this case, another term would exist as follows:

$$E_2 = \sum_{i=1}^{Nin} E_{2,i} = \sum_{i=1}^{Nin} \lambda_i f_i(x_i) (x_i - d_i)^2 \quad (21)$$

where, in this case, the sum is over the input patterns. Again, this cost would be minimized if all the values are equal to the desired values. If this is not possible, as is often the case in real-world situations with conflicting desires, an attempt is made to minimize the cost function such that the total sum-square-error is minimized over all patterns. It is also the case that the user does not have strict, exact values for the desired properties of the process, yet a desired range of values exist. To achieve the behavior in a "fuzzy-range", the fuzzy-cost-coefficient $f_i(z_i)$ can be used. This term functions totally analogously to the overall cost-coefficient $\lambda_i$, but, for the fuzzy coefficient, the cost varies as a function of the output parameter, decreasing to zero at the exact desired value, and increasing to one at the edges of the desired ranges. That is, the fuzzy-cost-coefficient is calculated as function of range as:

This provides a fuzzy-range value with the cost increasing as the value gets further away from the desired-value, where $z_i$ can be any one of the inputs or the $$f_i(z_i) = \begin{cases} 1; z_i < z_{lower} \\ z_i - \dfrac{z_{lower_1}}{d_i - z_{lower_1}} ; (z_{lower} < z_i < d_i) \\ z_i - \dfrac{d_i}{z_i - d_i} ; (d_i < z_i < z_{upper}) \\ 1; z_i > z_{upper_i} \end{cases} \quad (22)$$

outputs, or predicted state variables.

The system can also implement "soft constraints" or "fuzzy-constraints" that allow the user to specify a range of values which he desires the process to avoid. The cost terms of choice for this are as follows:

$$E_3 = \sum_{i=1}^{Nout} E_{3,i} = \sum_{i=1}^{Nout} \alpha_i(z_i(\vec{x}) - c_{upper,i})\theta(z_i(\vec{x}) - c_{upper,i}) \quad (23)$$

Where, $c_{upper,i}$ is the upper fuzzy-constraint limit on the variable, and $\theta(z_i)$ is the Heavyside Step Function, $\theta(z_i)=1$ for $z_i$ non-negative, $\theta(z_i)=0$ otherwise. Similarly, there is fourth term to implement the lower constraints:

$$E_4 = \sum_{i=1}^{Nout} E_{4,i} = \sum_{i=1}^{Nout} \beta_i(c_{lower,i} - z_i(\vec{x}))\theta(C_{lower,i} - z_i(\vec{x})) \quad (24)$$

Where, $c_{lower,i}$ is the lower fuzzy-constraint value and $\beta$ is a cost-coefficient. Thus, the total cost function is written in the present embodiment as:

$$E_{cost} = E_1 + E_2 + E_3 + E_4 \quad (25)$$

This cost function can be minimized via any one of the standard function-minimization techniques such as gradient-descent, simulated annealing, random-search, etc. In the preferred embodiment, the gradient-descent is utilized. In this process, the gradients of this cost function are calculated and the inputs x(i) are changed incrementally so as to minimize the total cost. This set of values will then be the new "recipe" to optimize the plant operation to achieve a desired set of properties.

With further reference to FIG. 3, it can be seen that the hard constraints placed on the input values are associated with the filter 46. The filter 46 allows the user to download parameters that will prevent the input parameters from exceeding certain values, and will also place constraints such as rate of change on the input variables. As described, these are "hard" constraints, which should be differentiated from "soft constraints" or "fuzzy-constraints". The soft constraints are constraints that can be violated, whereas the hard constraints are constraints that cannot be violated. For example, the system should never provide a setpoint with a value that is physically impossible. Therefore, this would be a hard constraint. However, a plant operator may determine that the operation of the valve above or below certain levels is questionable or unreliable and it would therefore be desirable to maintain the valve settings within certain "soft constraints". Additionally, there may be certain constraints that need to be placed on the output of the plant 10. These can be incorporated to the control net operation by placing these constraints onto the predicted output. These soft constraints on the input variables and the predicted output variables are effected by the cost minimization block 42, which performs the various calculations described above. These constraints are determined by the user during the analysis procedure and stored in the storage areas 49, 51 and 53 associated with the cost coefficients, fuzzy constraints and desired values, respectively.

As an example of a situation wherein cost coefficients would be utilized, suppose that the system consisted of a process that operated to output such things as impurity concentrations with input variables such as temperature, flow rates and pump speeds. Additionally, it is known that certain of the input variables, when varied from initial setting, have higher costs associated therewith. For example, it might be known that varying the pump speed would be extremely expensive due to the overall logistics associated therewith, as compared to varying a flow rate. Further, varying a temperature may also be expensive due to the efficiency with which a heater control could deliver a certain amount of heat to the process. As such, these could be identified and various cost coefficients associated therewith. For example, if it were known that varying a flow rate had no bearing on overall costs, then this could have a low high cost coefficient of, for example 0.05. On the other hand, varying the pump speed may be a very cost inefficient operation and this could have a relatively high cost coefficient associated therewith of, for example, 0.95. It may also be known that the flow rate is efficient only within certain regions, and above or below these regions, the expense goes very high. These would be the fuzzy constraints and could be set as such. Although illustrated in the above equations as being step functions, they could be any type of linear or non-linear function.

With respect to the output variables, it might be known that the impurity concentration of a given product, which impurity concentration is the measured value of the product, has a cost factor associated therewith. For a high impurity concentration, the impact of the change may be relatively high, whereas, for a low impurity concentration, the impact may be the opposite. By way of example, in semiconductor processing, it is always, of course, desirable to have a 100% yield. However, this is not practical and a more realistic yield percentage would exist. Since real world constraints require the yield to be above a defined minimum, which is a "break even" yield. Therefore, although it is desirable to have a 100% yield, a yield of 45%, for example, may be acceptable, especially if it relieves some of the constraints on the other processing parameters of process. It would not, for example, be cost efficient to increase the yield from 45% to 75% if this required an increase in the use of an expensive initial processing gas of, for example, Argon. These are relatively expensive gases and it would be desirable to minimize the use of this gas, even though the percent yield would go down, since the overall cost would be improved. Therefore, it can be seen that the desired values of the output and the inputs are not hard constraints.

Figure 15A:
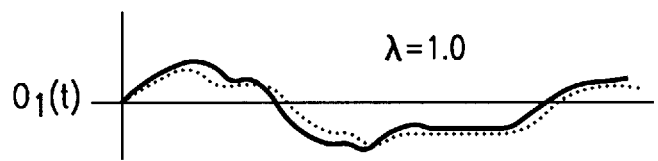
FIGS. 15a–15d illustrate plots of input and output variables with different cost-constraints.
Figure 15B:
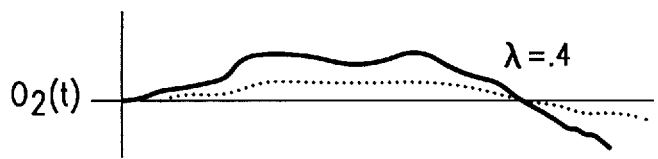
Figure 15C:
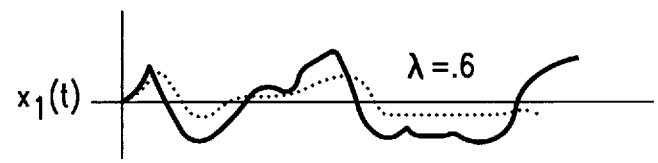
Figure 15D:
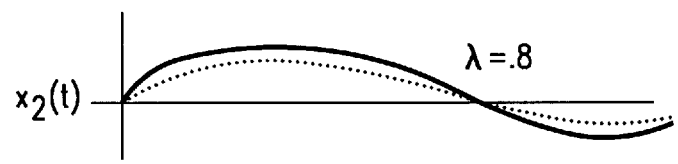

Referring now to FIGS. 15a–15b, there are illustrated the plots of two output variables $o_1(t)$ and $o_2(t)$ and a plot of two input variables $x_1(t)$ and $x_2(t)$. The cost coefficient $\lambda_1$ for the first output variable $o_1(t)$ is set equal to 1.0, whereas the cost coefficient $\lambda_2$ for the second output variable is set equal to 0.4. There are two plots, a solid line and a dotted line, the solid line representing the desired output for the plant and the dotted line representing the predicted output with the cost coefficient applied. It can be seen that for the case where $\lambda$ is set equal to 1.0, the predicted output and desired output were essentially the same. However, for the case where $\lambda$ is set equal to 0.4, the predicted output deviates from the desired output or the error therebetween is considerably higher with respect to the output variable $o_1(t)$. This is the same situation with the input variables $x_1(t)$ and $x_2(t)$, where the cost coefficients are set equal to 0.6 and 0.8, respectively. It can therefore be seen that by providing some type of cost constraint on the input variables and the output variable during the prediction operation that predicts the control inputs, the actual predicted control inputs may vary from an actual desired input or output. For example, in a conventional control net, a desired output is input to the net and the input variables forced to values that will result in the predicted output equalling the desired output. However, this may not be the most cost effective way to run the process. Therefore, it can be seen that the control net of the present invention will predict input variables in accordance with user defined criteria that will yield predicted input variables that will operate the plant under this criterion.

Figure 16:
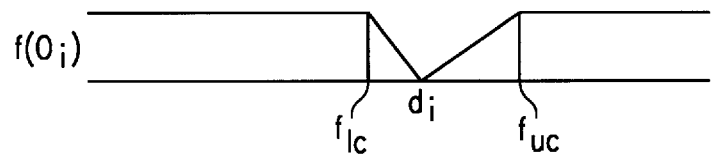
FIG. 16 illustrates a plot of the fuzzy-constraint function.

Referring now to FIG. 16, there is illustrated a plot of the fuzzy constraint function $f(o_i)$ as a function of the value of $o_i$. It can be seen that the value of this function is minimum at the desired value $d_i$ and increases in value as the value of $o_i$ deviates from $d_i$. At the lower constraint, $f_{LC}$, and at the upper constraint $f_{UC}$, the value maintains a constant value.

Figure 17:
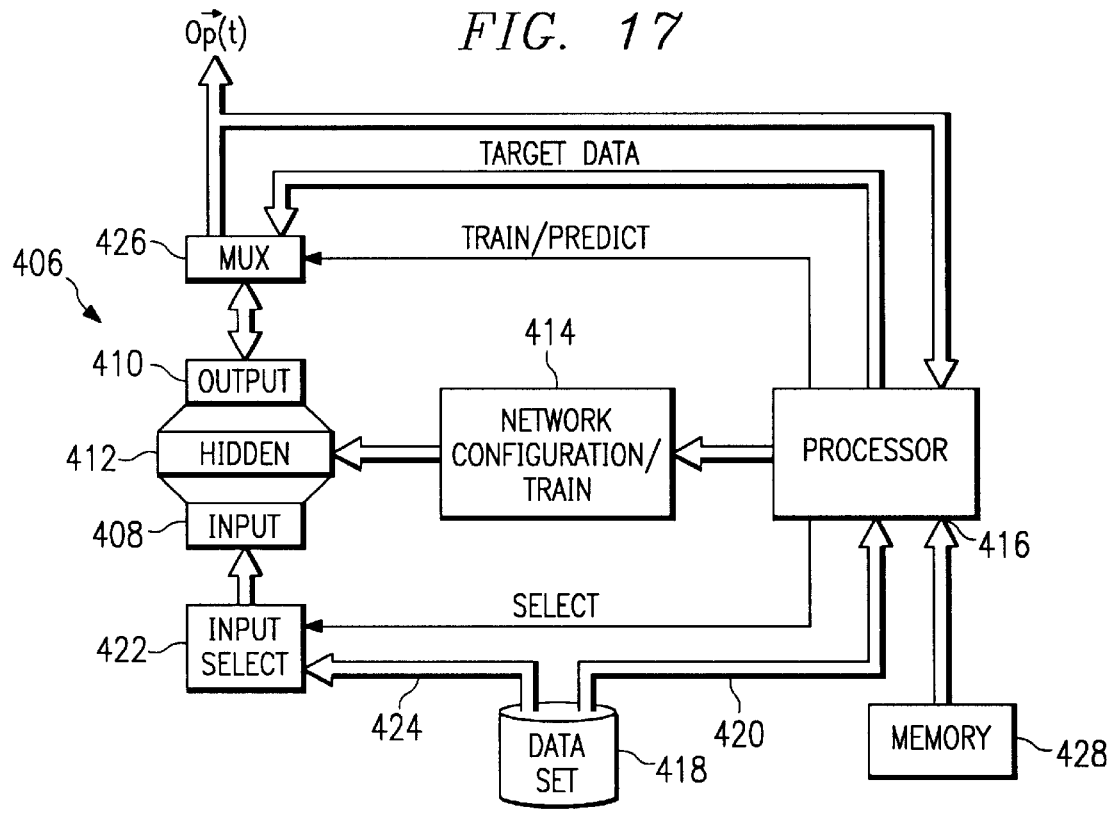
FIG. 17 illustrates a block diagram of the system for training a neural network to reduce the number of inputs in accordance with determined sensitivities of the outputs on the input variables.

Referring now FIG. 17, there is illustrated a block diagram of a neural network 406 that is trained on selected inputs, which inputs are selected as a function of the sensitivity of the output on the entire Dataset of the input variables. The neural network 406 is a conventional neural network comprised of an input layer 408, an output layer 410, and the hidden layer 412. The input layer 408 is interconnected to the nodes and the hidden layer 412 through an interconnection network with the output layer 410 similarly interconnected to the hidden layer 412. The hidden layer 412 is operable to map the input layer 408 to the output layer 410 through a stored representation of the plant 10. As will be described in more detail hereinbelow, the neural network 406 is configurable since the number of hidden nodes, the number of input nodes, and the number of output nodes can be varied, with the associated interconnects also being varied. This is a conventional Backpropagation network. However, any type of neural network that provides a non-linear representation of plant 10 could be utilized.

The neural network 406 is controlled by a network configuration/train system 14 which is operable to configure neural network 406 as to the number of hidden nodes, the weights, etc. Of course, the weights are learned during a training operation wherein an error is developed between a target output and a predicted output and this error Back-propagated through the network to set the various weights. The network configuration/train system 14 is controlled by a processor 416. The processor 416 is operable to interface with a database 418 that contains a plurality of training patterns which are referred to as the Dataset. The Dataset 418 is connected to the processor through a line 420, such that both input data and target data can be processed, the input data and target data operating in pairs.

During the training operation, the input data is selected by an input select block 422, which is interfaced through the database 418 through a line 424. The input select device 422 is operable in two modes, a first training mode wherein all the input data in the Dataset is selected, and a second mode wherein only select data is input to the neural network 406. The select data is determined during the sensitivity operation, wherein only the input data having the most effect on the output is selected, as will be described hereinbelow. The output of the input select circuit 422 is input to the input layer 408 as an input during the training operation. A multiplexer 426 is connected to the output layer 410 and is operable to input target data to the output layer 410 during the training mode, which target data is received from the processor 416, this target data retrieved from the database 418 by the processor 416. Additionally, multiplexer 426 is operable to output the predicted output $o_p(t)$. This output is input to the processor 416. The processor 416 is operable to control the multiplexer 426 to operate in the training mode or in the prediction mode, and also to control the input select device 422 to operate in the first or second mode associated therewith.

During learning, the neuronal units in the hidden layer, the hidden units, are mapped onto the input space in the input layer in a non-linear mapping procedure. However, in conventional neural networks utilizing multiple layers with at least one hidden layer, all possible layered environments are produced, thus requiring a large number of hidden units to effectively cover the input space. In order to adjust the weights and activation parameters of the neural network, a learning algorithm must be applied. One of the more widely used learning algorithms is the Back Propagation method, which is described in U.S. Pat. No. 4,893,255, issued to M. S. Tomlinson, Jr. on Jan. 9, 1990, which is incorporated herein by reference. This is also described in D. E. Rumelhart, G. E. Hinton, and R. J. Williams, "Learning Internal Representations by Error Propagation" (in D. E. Rumelhart & J. L. McClelland, Parallel Distributed Processing, Vol. 1, 1986), which is incorporated herein by reference. Back Propagation is essentially the backward propagation of error through the network with the changes being proportional to the error signal at the output of the network. Essentially, the error is first calculated for the output layer and then this error value utilized to calculate weight changes for units that feed into the output layer, which in turn uses weights for successive layers until the process terminates back at the input layer.

In operation, the neural network 406 is initially configured to accept all input variables in the input layer 408 such that there is node for each input. Therefore, a requisite number of hidden nodes will be required in order to interconnect with the maximum number of input nodes in input layer 408. Although the output may be changed, the output typically will remain the same for any configuration of the network 406. During the first mode, the neural network 406 is trained on all of the data patterns with all input variables input thereto. However, certain input variables have no effect on the output, i.e., sensitivity of the output to a given input variable may be substantially zero or of insignificant effect.

After the neural network 406 is trained on all input variables, the input data is then processed through the sensitivity algorithms described hereinabove with respect to Average Sensitivity, Absolute Average Sensitivity, and Peak Sensitivity. Since the neural network was trained through a Backpropagation technique, the partial derivatives already exist and the processor. These are typically stored in a memory 428. The processor 416 need only retrieve the partial derivatives that were precalculated during the training operation and stored in the memory 428 in order to calculate the sensitivities for each output variable as a function of each of the input variables. It should be noted, however, that the sensitivity calculations are not dependent on the model being trained with Backpropagation. The sensitivities of any model o(x) can be calculated by $$\frac{\partial o_i}{\partial x_j} = \frac{o_i(x_{1j}) - o_i(x_{2j})}{x_{1j} - x_{2j}} \quad (26)$$

numerical approximations to the derivitives as follows: Additionally, the memory 428 is operable to store user defined thresholds, which user defined thresholds determine what acceptable sensitivities are. If the sensitivity of a given output on any of the variables falls below a predetermined threshold, this input variable is determined to be insignificant and not necessary to provide an adequate representation of the system. However, it is important to note that the sensitivity operation is performed on a learned representation of the output on all of the input of variables, such that the combined effect of all other input variables are taken into account in this stored representation. If this were not the case, then any direct correlation function could be utilized wherein a single input variable were varied to determine the effect on the output. This is not acceptable since the system is non-linear and it is possible that a given input variable may have very little effect upon the output by itself, but when taken in combination with another input variable, the effect may be dramatic. The above equations relating to sensitivity take this into account.

Once the acceptable input variables have been determined (those that have an appropriate effect on the output), the input select circuit 422 is operated in a second mode and the input layer 408 reconfigured to have only the number of input nodes associated with the selected input variables selected by the input select circuit 422. The network 406 is then again trained with only these selected input variables. Thereafter, this network can be utilized to provide either a predictive network or a control network function, wherein the inputs are predicted. However, it is important to note that the operation of this network accepts only the limited number of select inputs. Although the total number of inputs received from the system are not incorporated into the updated network, it has been observed that this updated network with fewer number of inputs provides some degree of generalization in the training of the network.

Figure 18:
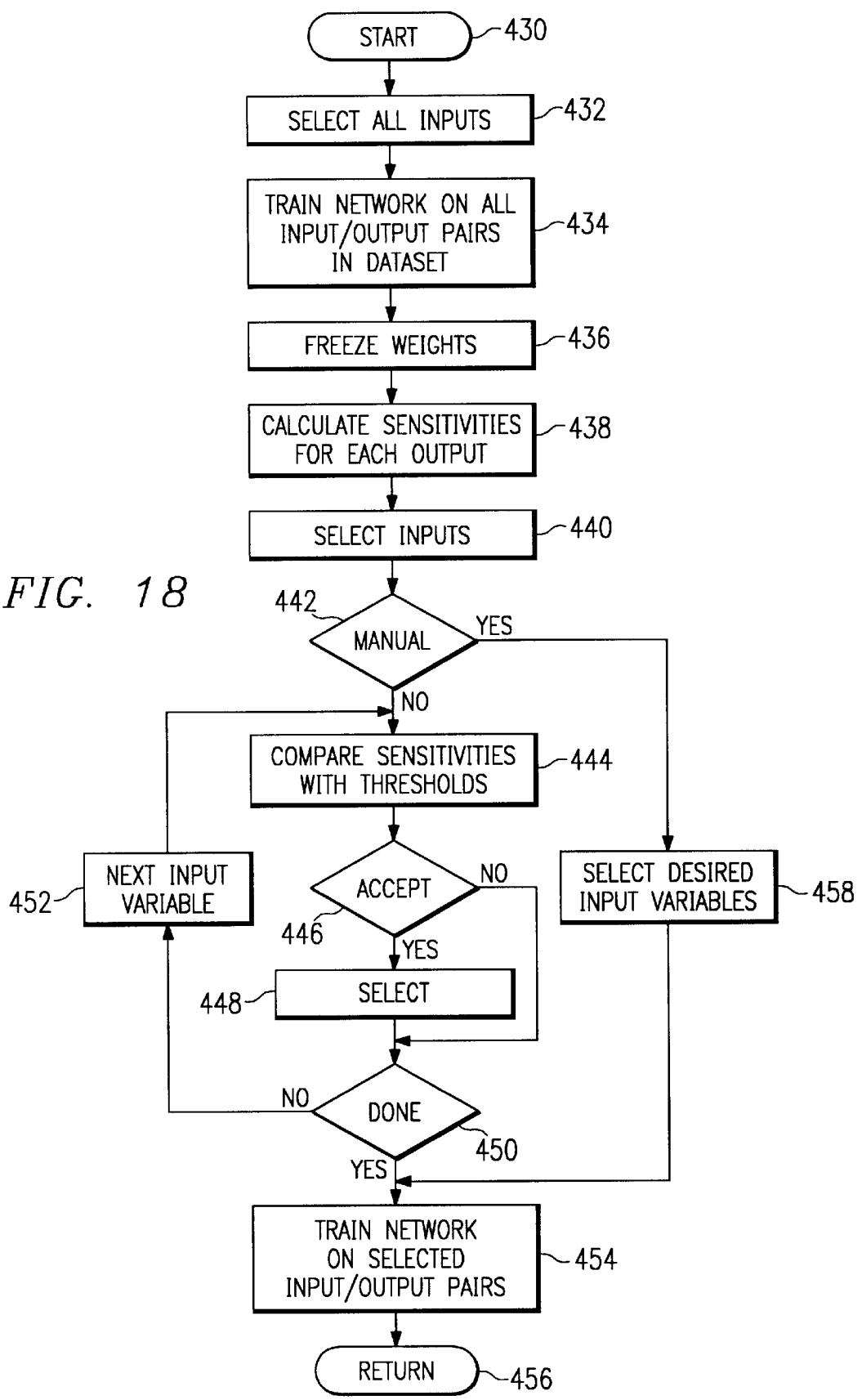
FIG. 18 illustrates a flow chart for training a neural network after a determination of the sensitivities.

Referring now to FIG. 18, there is illustrated a flow chart for the training operation for the neural network 406. The program is initiated at an initial Start block 430 and then proceeds to a function block 432 to select all input variables for input to the untrained network. The network 406 is then configured accordingly and trained in accordance with the Backpropagation training algorithm, as indicated by a block 434. The program then flows to block 436 to freeze the weights of the network and then to a function block 438 to calculate the sensitivities for each output variable. These sensitivities are then stored and the program flows to function block 440 to select the desired inputs.

During the selection of the desired inputs, the system can either do an automatic selection or a manual selection. This is indicated by a decision block 442. If automatic selection is chosen, the program will flow to a function block 444 to compare the sensitivities of the output on various input variables with thresholds. Any of the sensitivities that exceed a predetermined threshold will be selected and the others deselected. The program then flows to a decision block 446 to determine whether the inputs are selectable and, if so, the program flows along a "Y" path to function block a 448 to select and store the input variables and then the program flows to a decision block 450. If the value is not acceptable, the program flows from decision block 446 along the "N" to the input of the decision block 450.

The decision block 450 determines whether the operation is done, i.e, whether all inputs have been compared to the thresholds. If not, the program flows along the "N" path to the input of a function block 452 and then back to the input of the function block 444. When all input variables have been tested for each of the output variables relative to the sensitivity, the program flows to a function block 454 to train the network only on the selected input/output pairs. Alternatively, the deselected input/output pairs could have weights associated therewith forced to a "0" value during the second training operation such that the network would never train on these input/output pairs. The program would then flow to a return block 456.

If the manual operation is chosen, the program would flow from the decision block 442 along the "Y" path to the input of a function block 458 to select desired input variables. This can be done by a user examining various display plots of the sensitivity of the output variables as a function of the input variables and then make user-defined judgments about the data. After selection of the input variables, the program flows to the input of function block 454 and then the neural network 406 will be trained on only those selected variables.

Figure 19:
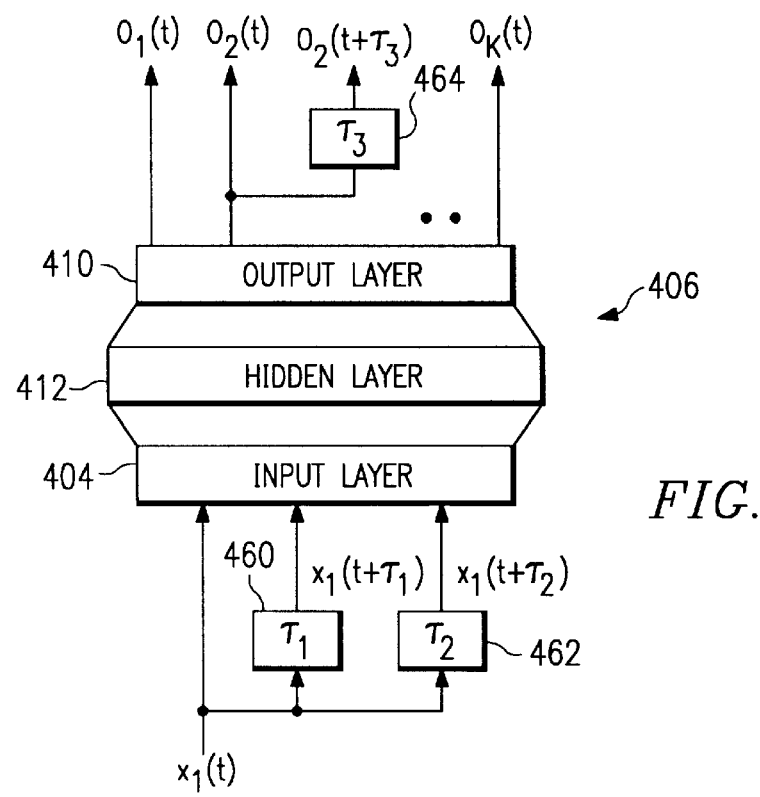
FIG. 19 illustrates a block diagram of a neural network having inputs with different delays.

Referring now to FIG. 19, there is illustrated a detail of the neural network 406 with only select inputs and outputs illustrated. The select input variables can be any one of the input variables in the Dataset in addition to delayed forms of that variable. One technique for defining delayed forms of an input variable is described in U.S. patent application Ser. No. 008,218, filed Jan. 25, 1993, and entitled "A PREDICTIVE NETWORK WITH LEARNED PREPROCESSING PARAMETERS", now U.S. Pat. No. 5,479,573. In general, the input variable $x_1(t)$ is passed through either a delay block 460 with a delay $\tau_1$ or a delay block 462 to provide a delay $\tau_2$. The output of delay block 460 will be delayed input variable $x_1(t+\tau_1)$ and the output of delay block 462 will be the input variable $x_1(t+\tau_2)$. It will be appreciated that each of these input variables, although related to a single input variable by a delay, will elicit a given response in the output variables such that each of the input variables, whether they are delayed from a given input variable, will have a different sensitivity. The output variables from the output layer 410 can also be delayed. For example, the output variable $O_2(t)$ can constitute one output variable with another output variable $O_2(t+\tau_3)$ provided by passing the variable $O_2(t)$ through a delay lock 464.

Figure 20:
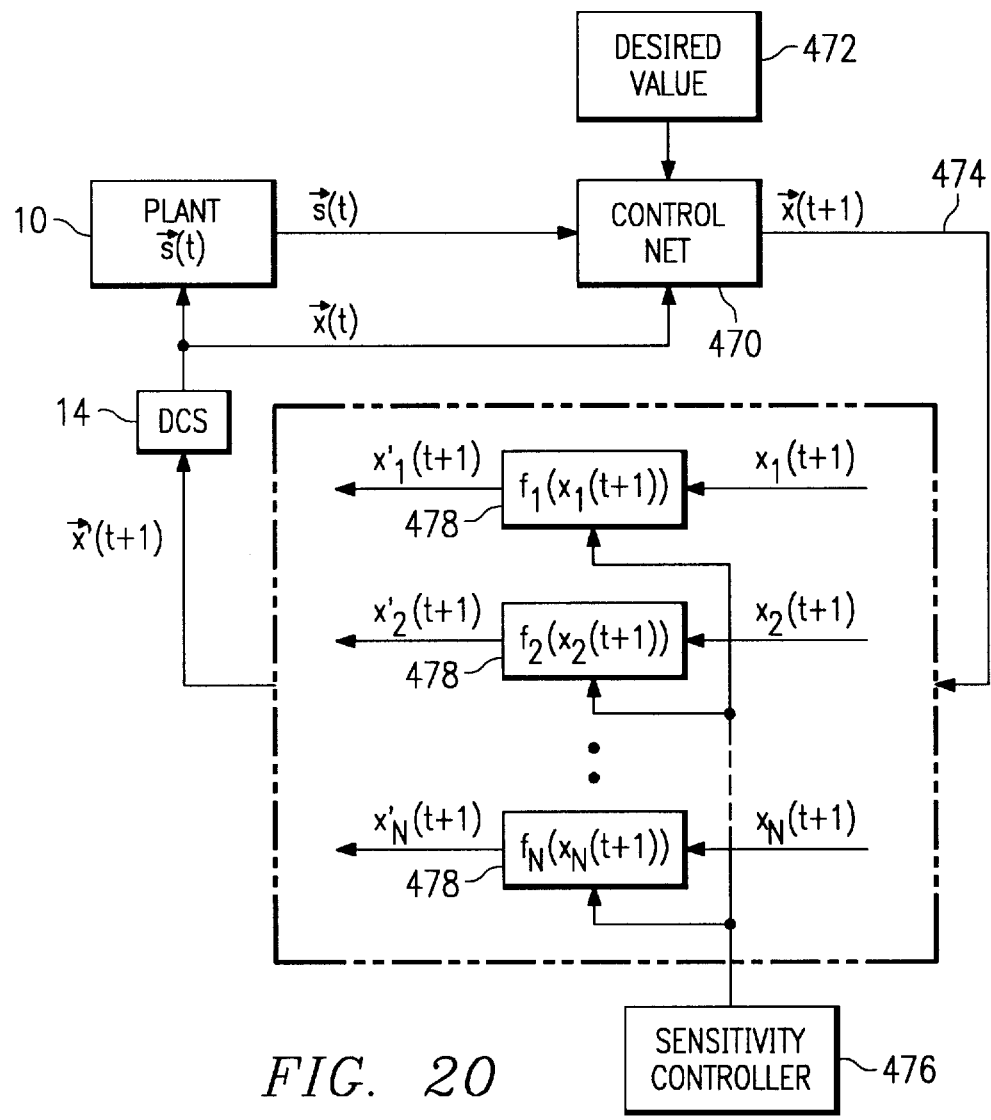
FIG. 20 illustrates a block diagram of the control network utilizing the determined sensitivities to change the predicted inputs to the DCS.

Referring now to FIG. 20, there is illustrated a block diagram of the control function wherein control inputs are predicted and varied through the use of the sensitivity operation. As described above, with respect to FIGS. 17 and 18, the neural network is trained and utilized as a control network 470. This control network 470 is similarly described above with respect to FIG. 3 wherein both a plant model 54 exists and an inverse plant model 56 exists. The control network 470 is operable to receive the input variables x(t) and the state variables s(t). In addition, the control network 470 must receive some type of desired value, as indicated by block 472. The desired value, in addition to the other inputs, allows an error to be generated, which error is then propagated through the inverse model in the control network 472 to generate a predicted input x(t+1). This is output on a line 472. In a typical operation, the updated variable x(t+1) is input directly to DCS 14. However, each of the input variables in x(t+1) is modified by the sensitivity of the output variables on that input variable. For example, if certain input variables such as pump speed are determined to have little effect on the output, a prediction by the control network 470 that this input variable should change is modified as compared to the other variables wherein the output has a higher sensitivity to those other variables. In this manner, unnecessary changes in the pump speed can be prevented, since this has little or no effect on the output, even though the control network 470 predicted that this should change. Other parameters, such as a given temperature, may have been determined to have an output variable that is very sensitive to that temperature. As such, a predicted output indicating that the control input associated with the temperature measurement should be changed will be given maximum priority. Additionally, it may be determined that for certain ranges the pump speed has little effect on the output, but that for other ranges of input values of the pump speed, a greater effect on the output will be present. This could exist where, for example, a higher pump speed caused the pump to cavitate, thus having little or no effect on the output. By not changing the pump speed under these conditions or in this range, a more efficient system can be realized.

In order to modify the input variables, a sensitivity controller 476 is provided that controls variable modifier blocks 478 for each of the input variables. The input variable $x_1(t+1)$ is input to the associated variable modifier block 478 and processed through a function $f(x_1(t+1))$. Similarly, the remaining variables $x_2(t+1)$ through $x_N(t+1)$ also modified by appropriate functions $f_2(t+1)$ through $f_N(t+1)$.

In summary, there has been provided an analysis network for examining the operation of a distributed control system in the operating mode. The analysis network operates in the background independent of the operating control system and is operable to determine what parameters can be changed in order to produce certain desired effects or to merely examine the operation of the plant under certain artificial conditions. One aspect that can be analyzed is the sensitivity of various output variables on different values of the input variables. By determining such sensitivities, certain input variables can be determined as having no effect on the output and can therefore be eliminated from the network. In one mode, the sensitivity measurements can be utilized to modify the predicted input values for each of the input variables, such that the most sensitive input variables are given priority and passed through at their maximum predicted value, whereas the less sensitive input variables have the predicted values modified to pass through only a percentage of their predicted value or none of their predicted value. Alternatively, the actual control network itself can be built utilizing the sensitivity measurements. In this mode, the neural network is first trained on all of the input variables and the associated test patterns of input/output pairs, and then the sensitivity of the output variables on the input variables determined. The less sensitive input variables are then deselected and the network reconfigured to have only input nodes associated with the selected input variables. The network is then trained only on the selected input variables.

Although the preferred embodiment has been described in detail, it should be understood that various changes, substitutions and alterations can be made therein without departing from the spirit and scope of the invention as defined by the appended claims.

What is claimed is:

1. A system for determining a set of sensitive inputs in a non-linear predictive network having stored therein a representation of a plant, comprising:

a configurable network having:

an input layer for receiving a defined number of input variables, which defined number of input variables is a variable number, an output layer for outputting a defined number of outputs, each associated with an output variable, and a hidden layer for mapping said input layer to said output layer through a stored learned representation of the plant;

a dataset of training patterns representing substantially all of the input variables to the plant and associated measured output variables of the plant, with each of said training patterns having input values associated with said input variables and corresponding output values associated with said output variables;

a training system for training said configurable network in accordance with a predetermined training algorithm;

a sensitivity processor for determining as a sensitivity value the effect of each of said input variables input to said configurable network on a learned representation of said output variables, wherein the combined effects of all other input variables are taken into account;

a central processor for configuring said network to receive substantially all of said input variables in a first mode and controlling said training system to train said configurable network with substantially all of said input variables and said output variables in said dataset;

said central processor controlling said sensitivity processor to determine said sensitivity values associated with each of said input variables and compare said determined sensitivity values with a predetermined threshold and select only the ones of said input variables from said dataset having a sensitivity value that exceeds said sensitivity threshold, this being defined as a selected dataset; and said central processor operable to configure said network to receive only input variables from said received input variables from said selected dataset and control said training system to train said configurable network on said selected dataset to provide a stored learned representation of a plant trained only on the selected input variables.

2. The system of claim 1 wherein said training algorithm comprises a backpropagation training algorithm and said non-linear predictive network comprises a neural network.

3. A control network for predicting control inputs for input to a distributed control system, which distributed control system outputs controls for input to a plant, the control inputs associated with the input variables to the plant, comprising:

a control model for storing a representation of the plant;

a desired value input defining desired operating parameters for the plant;

said control model operable to receive as inputs the control inputs output by the distributed control system and said desired value input, and predicted control input values for input as updated control inputs to the distributive distributed control system that are necessary to achieve said desired operating parameters associated with said desired value input;

a memory for storing sensitivity modifiers for defining the effect of each of the input variables on the plant output; and a modifier circuit for modifying the value of the predicted control input values prior to input to the distributed control system in accordance with a predetermined function of said pre-stored sensitivity modifiers in said memory.

4. The control network of claim 3 wherein said control model comprises a neural network having an input layer and an output layer with a hidden layer for mapping said input layer to said output layer through said stored representation of the plant.

5. The control network of claim 3 wherein said control model comprises:

a predictive network having stored therein a representation of the plant and for receiving the control inputs output by the distributed control system and generating a predicted plant output;

an error generator for determining the error between said desired value input and the predicted output of said predictive network; and an inverse predictive network substantially similar to said predictive network for receiving said error value on the output thereof and propagating the error through the network in an inverse direction to the input thereof and changing the input values to minimize said error, the input of said inverse network outputting said predicted control inputs.

6. The control network of claim 5 wherein said error is propagated through said inverse predictive network and the error minimized in accordance with a backpropagation-to-activation algorithm.

7. The control network of claim 3 and further comprising an analysis system for determining said sensitivity modifiers and, after determination thereof, storing said sensitivity modifiers in said memory.

8. The control network of claim 7 wherein said stored representation is a learned representation and said analysis system comprises:

a dataset memory for storing a plurality of training patterns on which said control model was trained to learn said stored representation, said training patterns representing the input variables and measured output variables available to train said control model on in order to generate said learned representation, with each of said training patterns having input values associated with said input variables and corresponding output values associated with said associated output variables; and means for determining the effect of each of the input variables on a learned representation of said output variables, which learned representation of said output variables was learned as a function of all of the input variables, and wherein the combined effects of all input variables are taken into account in said learned representation of said output variables.

9. The control network of claim 8 wherein there are I output variables $o_i$ and j input variables $x_j$, wherein said means for determining is operable to calculate said sensitivity modifiers for the jth variable/ith output variable, combination as follows:

$$\frac{\sum\limits_{k=1}^{Npats} \frac{\partial o_{k,i}}{\partial x_j}}{Npats}$$

where $N_{pats}$ is the number of training patterns in said memory and $o_{k,i}$ is the ith output for the kth pattern.

10. The control network of claim 8 wherein there are I output variables $o_i$ and j input variables $x_j$, wherein said means for determining is operable to calculate said sensitivity modifiers for the jth variable/ith output variable, combination as follows:

$$\frac{\sum\limits_{k=1}^{Npats} \left| \frac{\partial o_{k,i}}{\partial x_j} \right|}{Npats}$$

where $N_{pats}$ is the number of training patterns in said memory and $o_{k,i}$ is the ith output for the kth pattern.

11. The control network of claim 8 wherein there are I output variables $o_i$ and j input variables $x_j$, wherein said means for determining is operable to calculate said sensitivity modifiers for the jth variable/ith output variable, combination as follows:

$$\max\left( \left| \frac{\partial o_{k,i}}{\partial x_j} \right|, k \in 1, 2 \ldots Npats \right)$$

where $N_{pats}$ is the number of training patterns in said memory and $o_{k,i}$ is the ith output for the kth pattern.

12. A method for generating control inputs with a distributed control system that generates control inputs for a plant, comprising the steps of:

providing a control model that contains a representation of a plant;

inputting a desired input value that defines desired operating parameters for the plant;

inputting the control inputs generated by the distributed control system to the control model;

predicting control input values that will allow the plant to operate at the desired input value by processing the desired input value and current control inputs from the distributed control system to generate an error and minimizing the error with the control model, the predicted control inputs operable to be input to the distributed control system in order for the distributed control system generate new control inputs;

storing sensitivity modifiers for defining the effect of each of the input variables on the plant output; and modifying the value of the predicted control input values prior to input to the distributed control system in accordance with a predetermined function of the stored sensitivity modifiers.

13. The method of claim 12 wherein the step of providing the control model comprises providing a neural network having an input layer and an output layer with a hidden layer for mapping the input layer to the output layer through the stored representation of the plant.

14. The method of claim 12 wherein the step of providing the control model comprises:

providing a predictive network having stored therein a representation of the plant and for receiving the control inputs output by the distributed control system and predicting a plant output;

providing an inverse predictive network substantially similar to the predictive network for receiving an error value on the output thereof and propagating the error through the inverse predictive network in an inverse direction to the input and changing the input values to minimize the error;

the step of predicting the control inputs comprising:

comparing the predicted plant output from the predictive network to the desired input value and generating the error for input to the output of the inverse predictive network, and controlling the predictive network and inverse network to minimize the error in the step of determining the error by alternately processing the input values from the inverse predictive network through the predictive network to generate a new error and then reprocess the error through the inverse network until the error is minimized, the value output from the input of the inverse predictive network comprising the predicted control inputs.

15. The method of claim 14 wherein the error is propagated through the inverse predictive network and the error minimized in accordance with a backpropagation-to-activation algorithm.

16. The method of claim 12 and further comprising determining the sensitivity modifiers and, after termination thereof, storing the sensitivities in the step of storing.

17. The method of claim 16 wherein the stored representation of the control model is a learned representation and the step of determining the sensitivity modifiers comprises:

storing a plurality of training patterns in a dataset memory, with the training patterns comprising patterns on which the control model was trained to learn the stored representation, the training patterns representing the input variables and measured output variables available to train the control model in order to generate the learned representation, with each of the training patterns having input values associated with the input variables and corresponding output values associated with the associated output variables; and determining the effect of each of the input variables on a learned representation on the output variables, which learned representation of the output variables was learned as a function of all of the input variables, and wherein the combined effects of all input variables are taken into account in the learned representation of the output variables.

18. The method of claim 17 wherein there are I output variables $o_i$ and j input variables $x_j$, wherein the step of determining is operable to calculate the sensitivity modifiers for the jth variable/ith output variable combination as follows:

$$\frac{\sum_{k=1}^{Npats} \frac{\partial o_{k,i}}{\partial x_j}}{Npats}$$

where $N_{pats}$ is the number of training patterns in the dataset memory and $o_{k,i}$ is the ith output for the kth pattern.

19. The method of claim 17 wherein there are I output variables $o_i$ and j input variables $x_j$, wherein step of determining is operable to calculate the sensitivity modifiers for the jth variable/ith output variable combination as follows:

$$\frac{\sum_{k=1}^{Npats} \left| \frac{\partial o_{k,i}}{\partial x_j} \right|}{Npats}$$

where $N_{pats}$ is the number of training patterns in the dataset memory and $o_{k,i}$ is the ith output for the kth pattern.

20. The method of claim 17 wherein there are I output variables $o_i$ and j input variables $x_j$, wherein step of determining is operable to calculate the sensitivity modifiers for the jth variable/ith output variable combination as follows:

$$\max\left( \left| \frac{\partial o_{k,i}}{\partial x_j} \right|, k \in 1, 2 \ldots Npats \right)$$

where $N_{pats}$ is the number of training patterns in the dataset and $o_{k,i}$ is the ith output for the kth pattern.

* * * * *